(12) United States Patent
Yamamoto et al.

(10) Patent No.: US 8,793,041 B2
(45) Date of Patent: Jul. 29, 2014

(54) ELECTRIC POWERED VEHICLE AND CONTROL METHOD FOR THE SAME

(75) Inventors: Masaya Yamamoto, Kasugai (JP); Norihiko Kato, Handa (JP); Haruki Sato, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/126,653

(22) PCT Filed: Oct. 31, 2008

(86) PCT No.: PCT/JP2008/069872
§ 371 (c)(1),
(2), (4) Date: Apr. 28, 2011

(87) PCT Pub. No.: WO2010/050046
PCT Pub. Date: May 6, 2010

(65) Prior Publication Data
US 2011/0208383 A1    Aug. 25, 2011

(51) Int. Cl.
*B60W 20/00*    (2006.01)
*H02P 3/14*    (2006.01)
*B60L 11/18*    (2006.01)
*B60L 15/00*    (2006.01)

(52) U.S. Cl.
USPC .................. 701/22; 307/31; 701/101

(58) Field of Classification Search
None
See application file for complete search history.

(56) References Cited

U.S. PATENT DOCUMENTS

| 5,780,980 | A  | * | 7/1998  | Naito ........................... 318/139 |
| 5,883,496 | A  |   | 3/1999  | Esaki et al. |
| 6,262,903 | B1 |   | 7/2001  | Fujihashi et al. |
| 6,480,767 | B2 | * | 11/2002 | Yamaguchi et al. ............ 701/22 |
| 6,522,034 | B1 |   | 2/2003  | Nakayama |
| 6,608,396 | B2 |   | 8/2003  | Downer et al. |
| 6,794,846 | B2 |   | 9/2004  | Tsuji |
| 6,816,759 | B2 | * | 11/2004 | Kimura ......................... 701/22 |
| 6,819,985 | B2 |   | 11/2004 | Minagawa et al. |

(Continued)

FOREIGN PATENT DOCUMENTS

CN   101741115 A   6/2010
EP   1 914 139 A1   4/2008

(Continued)

OTHER PUBLICATIONS

U.S. Notice of Allowance dated May 28, 2013 issued in the corresponding U.S. Appl. No. 12/989,364.

(Continued)

*Primary Examiner* — John R Olszewski
*Assistant Examiner* — Jean-Paul Cass
(74) *Attorney, Agent, or Firm* — Sughrue Mion, PLLC

(57) ABSTRACT

A power supply system includes a main power storage device and a plurality of sub power storage devices. A converter is connected to a selected one of the sub power storage devices to perform voltage conversion bidirectionally between the selected sub power storage device and an electric power feeding line. A control device executes charging control for controlling input of electric power from a load device to the main power storage device and selected sub power storage device, and switching control for switching electrical connection between the plurality of sub power storage devices and electric power feeding line, according to a braking request of the electric powered vehicle. The control device prohibits or limits, until completion of one of the charging control and switching control, the other control.

28 Claims, 17 Drawing Sheets

(56) References Cited

U.S. PATENT DOCUMENTS

| | | | |
|---|---|---|---|
| 6,930,405 B2* | 8/2005 | Gunji | 290/40 C |
| 7,013,205 B1 | 3/2006 | Hafner et al. | |
| 7,075,306 B2 | 7/2006 | Emori et al. | |
| 7,136,727 B2 | 11/2006 | Seo et al. | |
| 7,151,326 B2 | 12/2006 | Jordan | |
| 7,332,881 B2* | 2/2008 | Clark et al. | 318/139 |
| 7,340,330 B2 | 3/2008 | Okoshi et al. | |
| 7,607,499 B2 | 10/2009 | Egami | |
| 7,653,474 B2* | 1/2010 | Cawthorne et al. | 701/99 |
| 7,672,762 B2* | 3/2010 | Matsubara | 701/22 |
| 7,719,232 B2 | 5/2010 | Kelty et al. | |
| 7,750,505 B2 | 7/2010 | Ichikawa | |
| 7,795,844 B2 | 9/2010 | Ichikawa et al. | |
| 7,839,013 B2* | 11/2010 | Nakamura et al. | 307/9.1 |
| 7,847,432 B2 | 12/2010 | Ichikawa | |
| 7,849,944 B2 | 12/2010 | DeVault | |
| 7,853,386 B2* | 12/2010 | Heap | 701/54 |
| 7,923,866 B2 | 4/2011 | Ichikawa et al. | |
| 7,928,603 B2 | 4/2011 | Ichikawa | |
| 7,933,694 B2* | 4/2011 | Kato | 701/22 |
| 7,939,969 B2 | 5/2011 | Ichikawa et al. | |
| 7,953,525 B2* | 5/2011 | Oyobe et al. | 701/22 |
| 7,956,489 B2 | 6/2011 | Ichikawa et al. | |
| 7,962,271 B1* | 6/2011 | Thompson et al. | 701/99 |
| 7,989,978 B2 | 8/2011 | Ichikawa | |
| 8,004,104 B2 | 8/2011 | Hench | |
| 8,027,759 B2* | 9/2011 | Saeki et al. | 701/22 |
| 8,089,177 B2* | 1/2012 | Kato | 307/10.1 |
| 8,504,227 B2* | 8/2013 | Ichishi | 701/22 |
| 8,508,079 B1* | 8/2013 | Corrado | 307/131 |
| 2002/0062183 A1* | 5/2002 | Yamaguchi et al. | 701/22 |
| 2002/0116099 A1 | 8/2002 | Tabata et al. | |
| 2003/0057908 A1 | 3/2003 | Kusaka et al. | |
| 2003/0090235 A1 | 5/2003 | Tsuji | |
| 2003/0107352 A1 | 6/2003 | Downer et al. | |
| 2004/0006419 A1* | 1/2004 | Kimura | 701/101 |
| 2004/0135544 A1 | 7/2004 | King et al. | |
| 2004/0135545 A1 | 7/2004 | Fowler et al. | |
| 2004/0138785 A1 | 7/2004 | Emori et al. | |
| 2004/0158365 A1 | 8/2004 | Tabata et al. | |
| 2004/0160201 A1 | 8/2004 | Rahman et al. | |
| 2005/0082097 A1 | 4/2005 | Ichimoto et al. | |
| 2005/0256631 A1 | 11/2005 | Cawthorne et al. | |
| 2006/0012372 A1 | 1/2006 | Emori et al. | |
| 2006/0058897 A1 | 3/2006 | Senda et al. | |
| 2006/0109008 A1 | 5/2006 | Emori et al. | |
| 2006/0161328 A1* | 7/2006 | Hoshiba et al. | 701/84 |
| 2008/0084179 A1 | 4/2008 | Emori et al. | |
| 2008/0169785 A1* | 7/2008 | Kim | 320/124 |
| 2008/0215200 A1* | 9/2008 | Toth | 701/22 |
| 2008/0228334 A1* | 9/2008 | Hashimoto | 701/22 |
| 2008/0270023 A1* | 10/2008 | Kumar | 701/207 |
| 2009/0008168 A1 | 1/2009 | Yamanaka et al. | |
| 2009/0058329 A1 | 3/2009 | Ichikawa | |
| 2009/0067202 A1 | 3/2009 | Ichikawa et al. | |
| 2009/0091291 A1* | 4/2009 | Woody et al. | 320/109 |
| 2009/0143929 A1* | 6/2009 | Eberhard et al. | 701/22 |
| 2009/0145675 A1 | 6/2009 | Ichikawa | |
| 2009/0160247 A1 | 6/2009 | Nakamura et al. | |
| 2009/0179616 A1 | 7/2009 | Ichikawa et al. | |
| 2009/0183934 A1 | 7/2009 | Oyobe et al. | |
| 2009/0195067 A1 | 8/2009 | Ichikawa et al. | |
| 2009/0243385 A1 | 10/2009 | Ichikawa et al. | |
| 2009/0261658 A1 | 10/2009 | Kato | |
| 2009/0273235 A1 | 11/2009 | Ichikawa | |
| 2009/0289497 A1 | 11/2009 | Ichikawa et al. | |
| 2009/0299560 A1* | 12/2009 | Tomatsuri et al. | 701/22 |
| 2009/0306843 A1* | 12/2009 | Jinno et al. | 701/22 |
| 2009/0315392 A1 | 12/2009 | Ichikawa et al. | |
| 2010/0001583 A1 | 1/2010 | Ichikawa | |
| 2010/0019729 A1 | 1/2010 | Kaita et al. | |
| 2010/0038962 A1 | 2/2010 | Komatsu | |
| 2010/0065349 A1 | 3/2010 | Ichikawa et al. | |
| 2010/0094497 A1 | 4/2010 | Oyobe et al. | |
| 2010/0096918 A1 | 4/2010 | Sawada et al. | |
| 2010/0096922 A1 | 4/2010 | Kishimoto | |
| 2010/0100264 A1 | 4/2010 | Kato | |
| 2010/0106351 A1 | 4/2010 | Hanssen et al. | |
| 2010/0148728 A1 | 6/2010 | Emori et al. | |
| 2010/0181829 A1* | 7/2010 | Ichikawa et al. | 307/9.1 |
| 2011/0040436 A1* | 2/2011 | Yamamoto et al. | 701/22 |
| 2011/0087395 A1* | 4/2011 | Yamamoto et al. | 701/22 |
| 2011/0178664 A1* | 7/2011 | Yamamoto et al. | 701/22 |
| 2011/0208383 A1* | 8/2011 | Yamamoto et al. | 701/22 |
| 2011/0251745 A1* | 10/2011 | Yamamoto et al. | 701/22 |
| 2011/0257825 A1* | 10/2011 | Yamamoto et al. | 701/22 |
| 2012/0104980 A1* | 5/2012 | Ramu | 318/139 |

FOREIGN PATENT DOCUMENTS

| | | |
|---|---|---|
| EP | 2 104 199 A1 | 9/2009 |
| JP | 06-209532 A | 7/1994 |
| JP | 07-170610 A | 7/1995 |
| JP | 08103068 * | 4/1996 |
| JP | 08-126121 A | 5/1996 |
| JP | 09-093807 A | 4/1997 |
| JP | 09151726 * | 6/1997 |
| JP | 09-233710 A | 9/1997 |
| JP | 09-298805 A | 11/1997 |
| JP | 2000-217201 A | 8/2000 |
| JP | 2001-078356 A | 3/2001 |
| JP | 2002-186195 A | 6/2002 |
| JP | 2003-023703 A | 1/2003 |
| JP | 2003-102181 A | 4/2003 |
| JP | 2003-153597 A | 5/2003 |
| JP | 2003-209969 A | 7/2003 |
| JP | 2003-235169 A | 8/2003 |
| JP | 2004-027844 A | 1/2004 |
| JP | 2004-136731 A | 5/2004 |
| JP | 2004-147477 A | 5/2004 |
| JP | 2004-215459 A | 7/2004 |
| JP | 2004-359032 A | 12/2004 |
| JP | 2005-033899 A | 2/2005 |
| JP | 2005-170086 A | 6/2005 |
| JP | 3655277 B2 | 6/2005 |
| JP | 2006-094691 A | 4/2006 |
| JP | 2007-062640 A | 3/2007 |
| JP | 2008-109840 A | 5/2008 |
| JP | 2008-131769 A | 6/2008 |
| JP | 2008-167620 A | 7/2008 |
| JP | 2008-219964 A | 9/2008 |
| JP | 2008-220084 A | 9/2008 |
| JP | 2009-183108 A | 8/2009 |
| JP | 2009-189152 A | 8/2009 |
| JP | 2009-194997 A | 8/2009 |
| JP | 2009-261183 A | 11/2009 |
| JP | 2010-098823 A | 4/2010 |
| JP | 2010-104096 A | 5/2010 |
| JP | 2010-104129 A | 5/2010 |
| WO | 03/045724 A2 | 6/2003 |
| WO | 03/045724 A3 | 6/2003 |
| WO | 2008/041735 A1 | 4/2008 |

OTHER PUBLICATIONS

Office Action mailed Dec. 31, 2012 for counterpart U.S. Appl. No. 12/989,364.

Supplemental Notice of Allowability mailed Nov. 29, 2010 for counterpart U.S. Appl. No. 12/573,204.

Notice of Allowance mailed Oct. 19, 2010 for counterpart U.S. Appl. No. 12/573,204.

Notice of Allowance mailed Jan. 5, 2011 for counterpart U.S. Appl. No. 12/582,929.

Notice of Allowance mailed Oct. 11, 2011 for counterpart U.S. Appl. No. 12/385,578.

Notice of Allowance mailed Jul. 14, 2010 for counterpart U.S. Appl. No. 11/990,025.

Office Action mailed Dec. 30, 2009 for counterpart U.S. Appl. No. 11/990,025.

"Silicon-on-insulator based high-temperature electronics for automotive applications; Huque, M.A et al.; Industrial Electronics, 2008. ISIE 2008. IEEE International Symposium on; Digital Object Iden-

(56) References Cited

OTHER PUBLICATIONS tifier : 10.1109/ISIE.2008.4677170; Publication Year: 2008, pp. 2538-2543".

"Steady State Analysis of Two Stage Converter Combined with Coupling Capacitor; Otsu, S.; Sato, T. ; Nabeshima, T. ; Nishijima, K.; Telecommunications Energy Conference, 2009. INTELEC 2009. 31st International; Digital Object Identifier : 10.1109/INTLEC.2009. 5351915; Publication Year: 2009, pp. 1-5".

"Techniques to Control the Electricity Generation in a Series Hybrid Electrical Vehicle; Barsali, S.; Ceraolo, M.; Possenti, A; .Power Engineering Review, IEEE vol. 22 , Issue: 4; Digital Object Identifier: 10.1109/MPER.2002.4312126; Publication Year: 2002; p. 74".

"A Fully Differential Comparator-Based Switched-Capacitor $\Delta\Sigma$ Modulator; Mu-Chen Huang; Shen-Iuan Liu; Circuits and Systems II: Express Briefs, IEEE Transactions on; vol. 56, Issue: 5; Digital Object Identifier : 10.1109/TCSII.2009.2019166; Publication Year:2009, pp. 369-373".

"High Efficiency Energy Storage System Design for Hybrid Electric Vehicle with Motor Drive Integration; Shuai Lu et al.; Ferdowsi, M.; Industry Applications Conference, 2006. 41st IAS Annual Meeting. Conference Record of the 2006 IEEE; vol. 5; Digital Object Identifier : 10.1109/IAS.2006.256899; Publication Year: 2006, pp. 2560-2567".

"Common-Mode Modeling of the Association of N-Switching Cells: Application to an Electric-Vehicle-Drive System; Labrousse, D.; Revol, B.; Costa, F.; Power Electronics, IEEE Transactions on; vol. 25 , Issue: 11; Digital Object Identifier: 10.1109/TPEL.2010. 2051457; Publication Year: 2010, pp. 2852-2859".

"A nine-switch three-level inverter for electric vehicle applications; Mingyan Wang; Kai Tian; Vehicle Power and Propulsion Conference, 2008. VPPC '08. IEEE; Digital Object Identifier: 10.1109/VPPC. 2008.4677649; Publication Year: 2008, pp. 1-5 ".

"Efficiency modeling and comparison of switched capacitor, Luo, and interleaved switched capacitor converters for electric vehicle Energy storage systems; Amjadi, Zahra; Williamson, Sheldon S.; IECON 2010—36th Annual Conference on IEEE Industrial Electronics Society.; Digital Object Identifier: 10.1109/IECON.2010. 5675402; Publication Year: 2010".

Electric Power Vehicle, China Communications Press, Version 1, Jan. 2003, Cover Pages & p. 58.

\* cited by examiner

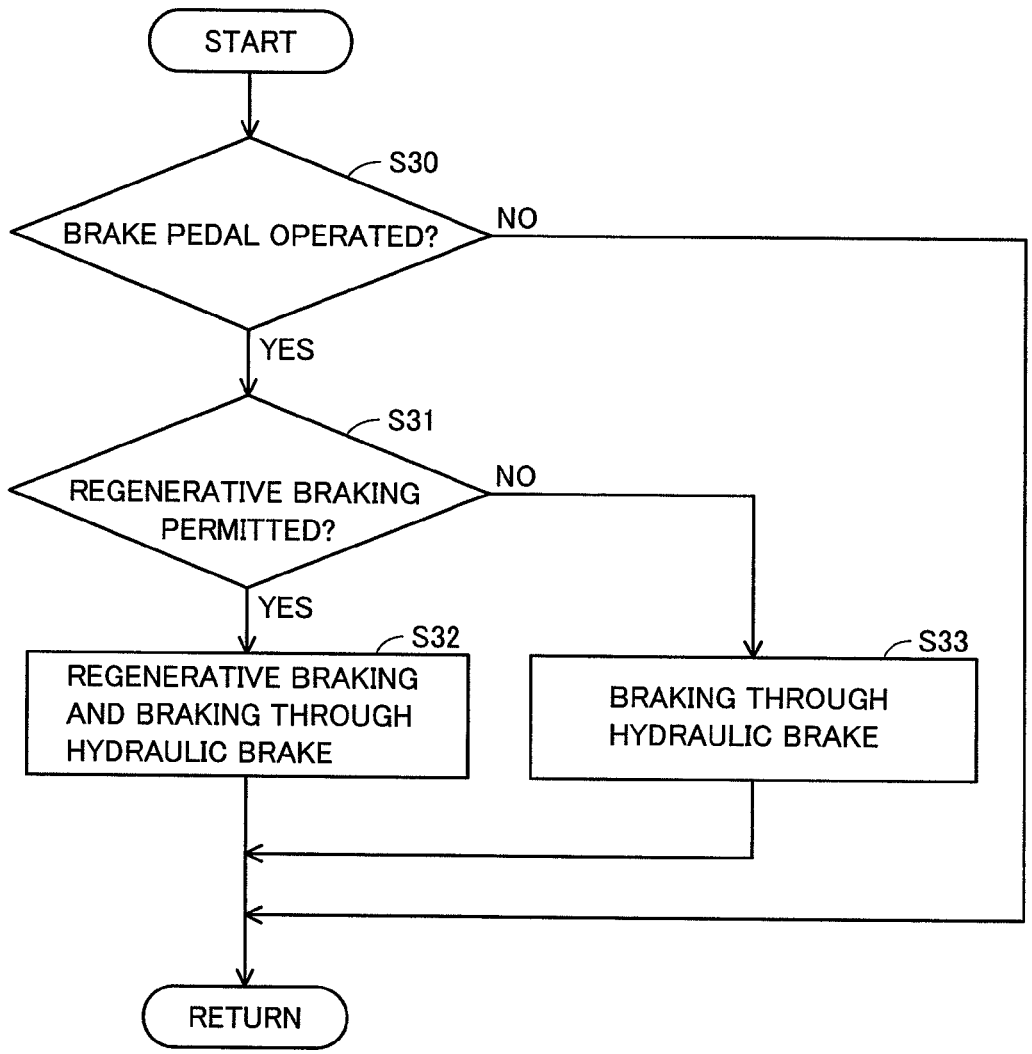

ELECTRIC POWERED VEHICLE AND CONTROL METHOD FOR THE SAME

CROSS REFERENCE TO RELATED APPLICATIONS

This application is a National Stage of International Application No. PCT/JP2008/069872 filed Oct. 31, 2008, the contents of all of which are incorporated herein by reference in their entirety.

TECHNICAL FIELD

The present invention relates to electric powered vehicles and methods of controlling the same, and more particularly to controlling an electric powered vehicle mounted with a power supply system including a main power storage device and a plurality of sub power storage devices.

BACKGROUND ART

In recent years as an environmentally friendly vehicle, electric powered vehicles such as an electric vehicle, hybrid vehicle and fuel cell vehicle have been developed into practical use. An electric powered vehicle has mounted thereon an electric motor generating force to drive the vehicle, and a power supply system including a power storage device for supplying electric power to drive the motor.

Particularly, there has been proposed a configuration for charging a vehicle-mounted power storage device in a hybrid vehicle by means of a power supply external to the vehicle (hereinafter also referred to as an "external power supply"), and accordingly, there is a demand for increasing the travel distance allowed through the electric power stored in the vehicle-mounted power storage device. Hereinafter, charging a vehicle-mounted power storage device by an external power supply will also simply be referred to as "external charging".

For example, Japanese Patent Laying-Open No. 2008-109840 (Patent Document 1) and Japanese Patent Laying-Open No. 2003-209969 (Patent Document 2) describe a power supply system having a plurality of power storage devices (batteries) connected in parallel. The power supply system described in Patent Document 1 and Patent Document 2 is provided with a voltage converter (a converter) for each power storage device (battery) as a charging/discharging adjustment mechanism. In contrast, Japanese Patent Laying-Open No. 2008-167620 (Patent Document 3) describes a power supply device in a vehicle having a main power storage device and a plurality of sub power storage devices mounted thereon, including a converter corresponding to the main power storage device and a converter shared by the plurality of sub power storage devices. This configuration is advantageous in that the storable amount of energy is increased while the number of elements constituting the device can be suppressed.

Patent Document 1: Japanese Patent Laying-Open No. 2008-109840
Patent Document 2: Japanese Patent Laying-Open No. 2003-209969
Patent Document 3: Japanese Patent Laying-Open No. 2008-167620

DISCLOSURE OF THE INVENTION

Problems to be Solved by the Invention

In the power supply device described in Patent Document 3, one of the plurality of sub power storage devices is selectively connected to the converter to allow the main power storage device and the selected sub power storage device to supply driving power for an electric motor to drive the vehicle. When the sub power storage device in use has a decreased state of charge in the power supply device, a different sub power storage device is newly connected to the converter such that the plurality of sub power storage devices are sequentially used to increase the travel distance allowed through the stored electric energy (EV (electric vehicle) travel distance). Although Patent Document 3 discloses switching control of a sub power storage device, it is silent about the relationship between the switching control and charging control of the sub power storage device.

In view of the foregoing, an object of the present invention is to provide control technique to allow appropriate execution of switching control and charging control of a sub power storage device in an electric powered vehicle mounted with a power supply system including a main power storage device and a plurality of sub power storage devices.

Means for Solving the Problem

According to an aspect of the present invention, an electric powered vehicle includes a load device, an electric power feeding line, a main power storage device receiving electric power from the load device via the electric power feeding line, a plurality of sub power storage devices provided parallel with each other, a connection unit, and a control device. The load device is configured to be capable of converting kinetic energy of the electric powered vehicle into electric power. The electric power feeding line transmits the electric power output from the load device. The connection unit is configured to allow electrical connection of a selected one of the plurality of sub power storage devices to the electric power feeding line. The control device controls the load device and the connection unit. The control device includes a charging control unit, a switching control unit, and a selection control unit. The charging control unit executes charging control for controlling input of electric power from the load device to the main power storage device and selected sub power storage device according to a braking request of the electric powered vehicle. The switching control unit executes switching control for switching electrical connection between the plurality of sub power storage devices and the electric power feeding line when determination is made that switching of the selected sub power storage device is required based on a state of charge of each of the plurality of sub power storage devices. The selection control unit prohibits, when charging control is started first, switching control until the charging control is completed, and limits, when switching control is started first, the charging control until switching control is completed.

Preferably, the selection control unit prohibits the switching control unit from switching control when the selected sub power storage device receives electric power from the load device by the charging control.

Preferably, the selection control unit prohibits the switching control unit from switching control when output of electric power from the load device is started by the charging control.

Preferably, the selection control unit limits the charging control by prohibiting input of the electric power from the load device to the selected sub power storage device when switching control is started.

Preferably, the switching control unit temporarily relaxes a first input limit value of the main power storage device, and sets a second input limit value of the selected sub power storage device at 0, following starting of switching control. The charging control unit executes input of electric power from the load device by the main power storage device based on the first input limit value.

Preferably, the selection control unit limits the charging control by prohibiting output of electric power by the load device when switching control is started.

Preferably, the load device includes a motor generator, and an inverter. The motor generator executes regenerative braking identified as conversion of kinetic energy of the electric powered vehicle into electric power, and generates kinetic energy of the electric powered vehicle by receiving electric power. The inverter has power fed by the electric power feeding line to drive the motor generator, and outputs, via the electric power feeding line, the electric power generated by the motor generator by regenerative braking.

Preferably, the electric powered vehicle further includes an internal combustion engine configured to be capable of outputting driving power of the electric powered vehicle. The load device includes a first motor generator, a second motor generator, and an inverter. The first motor generator is configured to allow power generation by being driven by the internal combustion engine. The second motor generator is capable of generating driving power independent of the internal combustion engine by receiving electric power, and executes regenerative braking as conversion of the kinetic energy of the electric powered vehicle into electric power. The inverter transmits and receives electric power between at least one of the first and second motor generators and the electric power feeding line.

Preferably, the selection control unit prohibits the switching control unit from switching control when the selected sub power storage device receives electric power from the second motor generator by the charging control.

Preferably, the selection control unit prohibits the switching control unit from switching control when output of electric power from the second motor generator is started by the charging control.

Preferably, the selection control unit limits the charging control by prohibiting input of the electric power from the second motor generator to the selected sub power storage device when switching control is started.

Preferably, the switching control unit temporarily relaxes a first input limit value of the main power storage device, and sets a second input limit value of the selected sub power storage device at 0, following starting of switching control. The charging control unit executes input of electric power from the load device by the main power storage device based on the first input limit value.

Preferably, the selection control unit limits the charging control by prohibiting output of electric power by the second motor generator when switching control is started.

Preferably, the electric powered vehicle further includes a hydraulic brake provided parallel with the second motor generator, and for executing braking of the electric powered vehicle. The selection control unit outputs an instruction to render regenerative braking by said second motor generator nonexecutable, as an instruction to prohibit the charging control unit from charging control when a braking request of the electric powered vehicle is generated during execution of switching control. The control device further includes a brake control unit for controlling regenerative braking by the second motor generator and braking by the hydraulic brake. The brake control unit executes braking by the hydraulic brake when a braking request is generated and regenerative braking is prohibited.

Preferably, the electric powered vehicle further includes a first voltage converter and a second voltage converter. The first voltage converter is provided between the main power storage device and the electric power feeding line to perform voltage conversion bidirectionally. The second voltage converter is provided between the plurality of sub power storage devices and the electric power feeding line to perform voltage conversion bidirectionally.

Preferably, the connection unit electrically connects the selected sub power storage device to the electric power feeding line by connecting the selected sub power storage device to the second voltage converter.

Another aspect of the present invention is directed to a control method for an electric powered vehicle. The electric powered vehicle includes a load device, an electric power feeding line, a main power storage device receiving electric power from the load device via the electric power feeding line, a plurality of sub power storage devices provided parallel with each other, a connection unit, and a control device. The load device is configured to be capable of converting kinetic energy of the electric powered vehicle into electric power. The electric power feeding line transmits the electric power output from the load device. The connection unit is configured to allow electrical connection of a selected one of the plurality of sub power storage devices to the electric power feeding line. The control device controls the load device and the connection unit. The control method includes the steps of: executing charging control for controlling input of electric power from the load device to the main power storage device and selected sub power storage device according to a braking request of the electric powered vehicle; executing switching control for switching electrical connection between the plurality of sub power storage devices and the electric power feeding line when determination is made that switching of the selected sub power storage device is required based on a state of charge of each of the plurality of sub power storage devices; and executing selection control to prohibit, when charging control is started first, switching control until charging control is completed, and to limit, when switching control is started first, the charging control until switching control is completed.

Preferably, the step of executing selection control prohibits switching control when a selected sub power storage device receives electric power from the load device by charging control.

Preferably, the step of executing selection control prohibits switching control when output of electric power from the load device is started by charging control.

Preferably, the step of executing selection control limits the charging control by prohibiting inputs of the electric power from the load device to the selected sub power storage device when switching control is started.

Preferably, the step of executing switching control temporarily relaxes a first input limit value of the main power storage device and sets a second input limit value of the selected sub power storage device at 0, following starting of switching control. The step of executing charging control executes input of electric power from the load device by the main power storage device based on the first input limit value.

Preferably, the step of executing selection control limits the charging control by prohibiting output of the electric power by the load device when switching control is started.

Preferably, the load device includes a motor generator and an inverter. The motor generator executes regenerative braking as conversion of kinetic energy of the electric powered vehicle into electric power, and generates kinetic energy of the electric powered vehicle by receiving electric power. The inverter is fed with power by the electric power feeding line to drive the motor generator, and outputs, via the electric power feeding line, the electric power generated by the motor generator by regenerative braking.

Preferably, the electric powered vehicle further includes an internal combustion engine configured to be capable of outputting driving power of the electric powered vehicle. The load device includes a first motor generator, a second motor generator, and an inverter. The first motor generator is configured to allow power generation by being driven by the internal combustion engine. The second motor generator is capable of generating driving power independent of the internal combustion engine by receiving electric power, and executes regenerative braking identified as conversion of the kinetic energy of the electric powered vehicle into electric power. The inverter transmits and receives electric power between at least one of the first and second motor generators and the electric power feeding line.

Preferably, the step of executing selection control prohibits switching control when the selected sub power storage device receives electric power from the second motor generator by charging control.

Preferably, the step of executing selection control prohibits switching control when output of electric power from the second motor generator is started by charging control.

Preferably, the step of executing selection control limits the charging control by prohibiting input of the electric power from the second motor generator to the selected sub power storage device when switching control is started.

Preferably, the step of executing switching control temporarily relaxes the first input limit value of the main power storage device and sets the second input limit value of the selected sub power storage device at 0, following starting of switching control. The step of executing charging control executes input of electric power from the load device by the main power storage device based on the first input limit value.

Preferably, the step of executing selection control limits the charging control by prohibiting output of electric power by the second motor generator when switching control is started.

Preferably, the electric powered vehicle further includes a hydraulic brake provided parallel to the second motor generator, and executing braking of the electric powered vehicle. The step of executing selection control outputs an instruction to render regenerative braking by the second motor generator nonexecutable, identified as an instruction to prohibit the charging control unit from charging control when a braking request of the electric powered vehicle is generated during execution of switching control. The control method further includes the step of executing braking by the hydraulic brake when a braking request is generated and regenerative braking is prohibited.

Preferably, the electric powered vehicle further includes a first voltage converter and a second voltage converter. The first voltage converter is provided between the main power storage device and the electric power feeding line to perform voltage conversion bidirectionally. The second voltage converter is provided between the plurality of sub power storage devices and the electric power feeding line to perform voltage conversion bidirectionally.

Preferably, the connection unit electrically connects the selected sub power storage device to the electric power feeding line by connecting the selected sub power storage device to the second voltage converter.

Effects of the Invention

According to the present invention, switching control and charging control of a sub power storage device can be executed appropriately in an electric powered vehicle mounted with a power supply system including a main power storage device and a plurality of sub power storage devices.

BRIEF DESCRIPTION OF THE DRAWINGS

FIG. 21 is a flowchart for describing a process of a brake control unit 32A.

Figure 1:
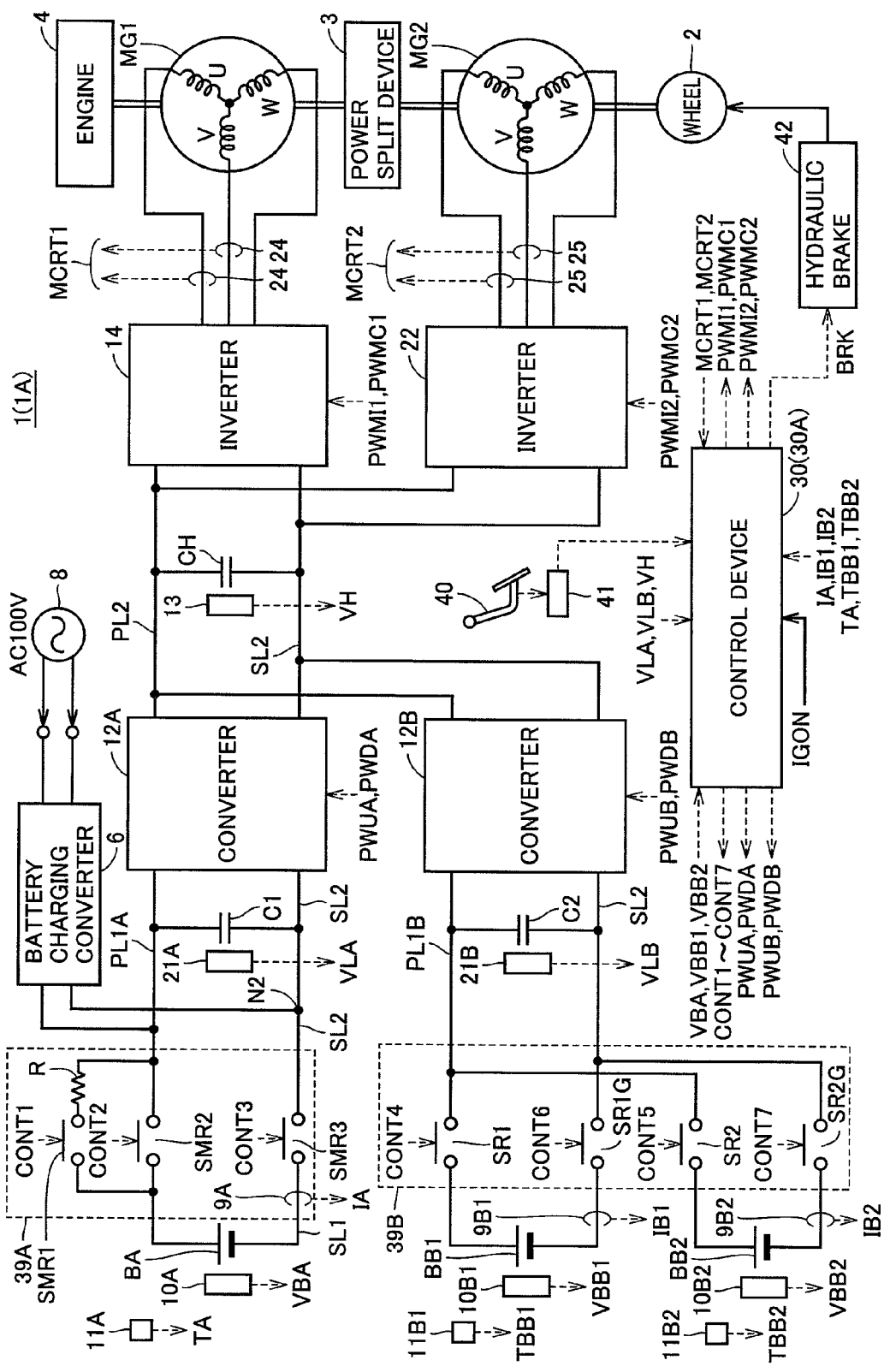
FIG. 1 shows a main configuration of an electric powered vehicle incorporating a power supply system according to a first embodiment of the present invention.

DESCRIPTION OF THE REFERENCE SIGNS 1,1A: electric powered vehicle, 2: wheel, 3: power split device, 4: engine, 6: battery charging converter (external charging), 8: external power supply, 9A, 9B1, 9B2: current sensor, 10A, 10B1, 10B2, 13, 21A, 21B: voltage sensor, 11A, 11B1, 11B2: temperature sensor, 12A: converter(exclusively for main power storage device), 12B: converter (shared by sub power storage devices), 14, 22: inverter, 15-17: each phase arm (U, V, W), 24, 25: current sensor, 30, 30A: control device, 31, 31A: electric system control unit, 32, 32A: brake control unit, 39A: connection unit(main power storage device), 39B: connection unit (sub power storage device), 40: brake pedal, 41: brake pedal stroke sensor, 42: hydraulic brake, 51, 51A: switching control unit, 52: charging and discharging control unit, 53, 53A: selection control unit, 100: switching determination unit, 110: step-up voltage instruction unit, 120: electric power limiter unit (main power storage device), 130: electric power limiter unit (sub power storage device), 140: connection control unit, 200: converter control unit, 250; traveling control unit, 260: total power calculation unit, 270, 280: inverter control unit, BA: battery (main power storage device), BB: selected sub power storage device, BB1, BB2: battery (sub power storage device), C1, C2, CH: smoothing capacitor, CMBT: voltage step-up command signal, CONT1-CONT7: relay control signal, D1-D8: diode, FBT: flag (voltage step-up completed), IA, IB1, IB2:input/output current(battery), ID: variable (switching process status), IGON: start signal, L1: reactor, MCRT1, MCRT2: motor current value, MG1, MG2: motor generator, N2: node, PL1A, PL1B: power supply line, PL2: electric power feeding line , Ptt1: total required power, PWM1, PWMI1, PWMI2, PWMC, PWMC1, PWMC2: control signal (for inverter), PWU, PWUA, PWDA, PWD, PWDA, PWDB: control signal (for converter), Q1-Q8: IGBT device, R: limiting resistor, SL1, SL2: ground line, SMR1-SMR3: system main relay, SR1, SR1G, SR2, SR2G: relay, TA, TBB1, TBB2: temperature (battery), Tqcom1, Tqcom2: torque command value, UL, VL, WL: line (3 phase), V1: predetermined voltage, VBA, VBB1, VBB2: voltage (battery output voltage), VLA, VLB, VH: voltage, VHref: voltage command value (VH), Win: upper limit on electric power input, Win (M): upper limit on electric power input (main power storage device), Win (S): upper limit on electric power input (sub power storage device), Wout: upper limit on electric power output, Wout (M) upper limit on electric power output (main power storage device), Wout (S): upper limit on electric power output (selected sub power storage device).

BEST MODES FOR CARRYING OUT THE INVENTION

Hereinafter reference will be made to the drawings to describe in detail the present invention in embodiments. In the drawings, identical or equivalent components are denoted by identical reference characters and description thereof will not be repeated.

[First Embodiment]

FIG. 1 shows a main configuration of an electric powered vehicle incorporating a power supply system according to a first embodiment of the present invention.

With reference to FIG. 1, an electric powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor generators MG1, MG2, a wheel 2, a power split device 3, an engine 4, and a control device 30.

The power supply system for an electric powered vehicle of the present embodiment includes a main power storage device implemented as battery BA, an electric power feeding line PL2 supplying electric power to inverter 14 driving motor generator MG2, a converter 12A provided between the main power storage device (BA) and electric power feeding line PL2 to serve as a voltage converter converting voltage bidirectionally, batteries BB1, BB2 implementing a plurality of sub power storage devices provided in a manner parallel with each other, and a converter 12B provided between the plurality of sub power storage devices (BB1, BB2) and electric power feeding line PL2 to serve as a voltage converter converting voltage bidirectionally. The voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that, when they are concurrently used, for example, the tolerable maximum power for an electric load (22, MG2) connected to the electric power feeding line can be output. This allows the vehicle to travel with maximum power in an EV (Electric Vehicle) running mode that does not use the engine. If the relevant sub power storage device's state of charge is decreased, the sub power storage device can be exchanged to cause the vehicle to travel further, and if the sub power storage device's electric power has completely been consumed, then, in addition to the main power storage device, the engine can be used to allow the vehicle to travel with maximum power without using the sub power storage device.

Furthermore, such a configuration allows converter 12B to be shared among the plurality of sub power storage devices. This can eliminate the necessity of increasing the number of converters corresponding to the number of the power storage devices. In order to further increase the EV travel distance, an additional battery can be introduced in parallel with batteries BB1, BB2.

Preferably, the main power storage device and sub power storage devices in the present electric powered vehicle are externally chargeable. For this purpose, electric powered vehicle 1 further includes a battery charging device (a charging converter) 6 for connection to an external power supply 8 which is, for example, a commercial power supply of AC 100V. Battery charging device 6 converts alternate current to direct current and also adjusts the voltage level to supply electric power charged to a battery. Note that external charging may be achieved by the above described configuration, and in addition, a system connecting a neutral point of a stator coil of motor generator MG1, MG2 to an alternate current power supply, or a system causing converters 12A, 12B to function together as an ac/dc conversion device.

Smoothing capacitor C1 is connected between a power supply line PL1A and a ground line SL2. Voltage sensor 21A detects voltage VLA across smoothing capacitor C1 for output to control device 30. Converter 12A can step up the voltage across smoothing capacitor C1 for output to electric power feeding line PL2.

Smoothing capacitor C2 is connected between a power supply line PL1B and ground line SL2. Voltage sensor 21B detects voltage VLB across smoothing capacitor C2 for output to control device 30. Converter 12B can step up the voltage across smoothing capacitor C2 for output to electric power feeding line PL2.

Smoothing capacitor CH smoothes the voltage stepped up by converters 12A, 12B. Voltage sensor 13 detects voltage VH across smoothing capacitor CH for output to control device 30.

Alternatively, in an opposite direction, converters 12A, 12B can step down voltage VH smoothed by smoothing capacitor CH for output to power supply lines PL1A, PL1B.

Inverter 14 receives direct current voltage from converter 12B and/or 12A, converts it to 3 phase alternate current voltage, and outputs it to motor generator MG1. Inverter 22 receives direct current voltage from converter 12B and/or 12A, converts it to 3 phase alternate current voltage, and outputs it to motor generator MG2.

Power split device 3 is a mechanism coupled to engine 4 and motor generators MG1, MG2 to distribute power therebetween. The power split device can for example be a planetary gear mechanism having the three shafts of rotation of a sun gear, a planetary carrier, and a ring gear. When two of the three shafts of rotation have their rotation determined in the planetary gear mechanism, the other one shaft of rotation is compulsively determined. These three shafts of rotation are connected to each shaft of rotation of engine 4, motor generator MG1, and motor generator MG2, respectively. Motor generator MG2 has its shaft of rotation coupled to vehicular wheel 2 by a reduction gear, a differential gear or the like (not shown). Furthermore, power split device 3 may further have a speed reducer incorporated therein with respect to the shaft of rotation of motor generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and node N2.

System main relays SMR1-SMR3 have their conduction/non-conduction states controlled (turned ON/OFF) by relay control signals CONT1-CONT3, respectively, issued from control device 30.

Voltage sensor 10A measures voltage VA across battery BA. Furthermore, temperature sensor 11A measures temperature TA of battery BA, and current sensor 9A measures a current IA input/output to/from battery BA. These measurements by the sensors are output to control device 30. Based on these measurements, control device 30 monitors a state of battery BA represented by the state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction/non-conduction states controlled (turned ON/OFF) by relay control signals CONT4, CONT5, respectively, issued from control device 30. Relays SR1G, SR2G have their conduction/non-conduction states controlled (turned ON/OFF) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by the SOC (state of charge).

Battery BA, BB1, BB2 may be, for example, a lead-acid battery, a nickel metal hydride battery, a lithium ion battery or a similar secondary battery, an electric double layer capacitor or a similar capacitor of large capacity, or the like.

Inverter 14 is connected to electric power feeding line PL2 and ground line SL2. Inverter 14 receives the voltage stepped up from converter 12A and/or converter 12B, and drives motor generator MG1, for example, to start engine 4. Furthermore, inverter 14 returns to converters 12A and 12B the electric power generated by motor generator MG1 by the power transmitted from engine 4. At this stage, converters 12A and 12B are controlled by control device 30 to operate as step down converters.

Current sensor 24 senses a current that flows to motor generator MG1 as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it to 3 phase alternate current voltage, and outputs it to motor generator MG2 that drives wheel 2. Furthermore, inverter 22 returns to converters 12A and 12B the electric power generated by motor generator MG2 as the vehicle is regeneratively braked. At this stage, converters 12A and 12B are controlled by control device 30 to operate as step down converters.

Current sensor 25 senses a current that flows to motor generator MG2 as a motor current value MCRT2, and outputs motor current value MCRT2 to control device 30.

Control device 30 is constituted by an electronic control unit (ECU) having a central processing unit (CPU) and a memory (not shown) incorporated therein, and in accordance with a map and a program stored in the memory, uses each sensor's measurement to perform an operation process. Note that control device 30 may have a portion configured to allow electronic circuitry or similar hardware to perform predetermined arithmetic and logical operations.

Specifically, control device 30 receives the torque command values and revolution speed for motor generators MG1, MG2, the values of voltage VBA, VBB1, VBB2, VLA, VLB, VH, motor current values MCRT1, MCRT2, and a start signal IGON. Control device 30 outputs a control signal PWUB instructing converter 12B to step up the voltage, a control signal PWDB to step down the voltage, and a shutdown signal for prohibiting an operation.

Furthermore, control device 30 outputs a control signal PWMI1 instructing inverter 14 to convert direct current voltage output from converters 12A, 12B to alternate current voltage for driving motor generator MG1, and a control signal PWMC1 to convert the alternate current voltage generated by motor generator MG1 to direct current voltage and return it toward converters 12A, 12B for instructing regeneration.

Similarly, control device 30 outputs a control signal PWMI2 instructing inverter 22 to convert direct current voltage to alternate current voltage for driving motor generator MG2, and a control signal PWMC2 to convert the alternate current voltage generated by motor generator MG2 to direct current voltage and return it toward converters 12A, 12B for instructing regeneration.

Electric powered vehicle 1 further includes a brake pedal 40, a brake pedal stroke sensor 41, and a hydraulic brake 42. Brake pedal 40 is operated by the user (driver). Brake pedal stroke sensor 41 detects the pedal stroke level when the user steps on brake pedal 40, and provides the detection result to control device 30. Control device 30 controls the regenerative braking by motor generator MG2 and the braking by hydraulic brake 42 based on the detected pedal stroke level. Accordingly, control device 30 issues a signal BRK to hydraulic brake 42.

Figure 2:
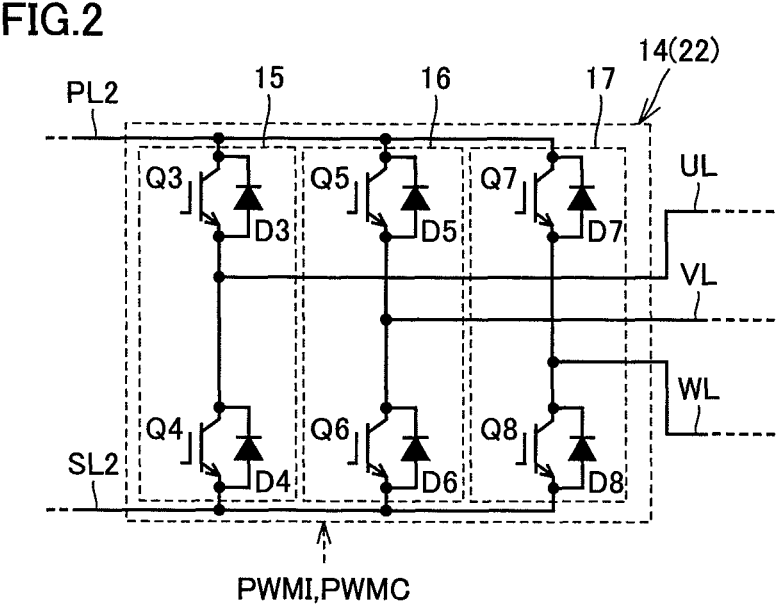
FIG. 2 is a circuit diagram showing in detail a configuration of inverters 14 and 22 of FIG. 1.

FIG. 2 is a circuit diagram showing in detail a configuration of inverters 14 and 22 of FIG. 1.

With reference to FIG. 2, inverter 14 includes a U phase arm 15, a V phase arm 16, and a W phase arm 17. U phase arm 15, V phase arm 16, and W phase arm 17 are connected between electric power feeding line PL2 and ground line SL2 in parallel.

U phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as done in U phase arm 15.

W phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as done in U phase arm 15.

Note that in the present embodiment an IGBT device is indicated as a representative example of a power semiconductor switching element controllable to be turned ON/OFF. In other words, it is also replaceable with a bipolar transistor, a field effect transistor or a similar power semiconductor switching element.

Each phase arm has an intermediate point connected to motor generator MG1 at each phase coil at each phase end. In other words, motor generator MG1 is a 3 phase permanent magnet synchronous motor and the three U, V, W phase coils each have one end connected together to an intermediate point. The U phase coil has the other end connected to a line UL drawn from a connection node of IGBT devices Q3, Q4. The V phase coil has the other end connected to a line VL drawn from a connection node of IGBT devices Q5, Q6. The W phase coil has the other end connected to a line WL drawn from a connection node of IGBT devices Q7, Q8.

Inverter 22 shown in FIG. 1 is different in that it is connected to motor generator MG2. However, its internal circuit configuration is similar to inverter 14. Accordingly it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
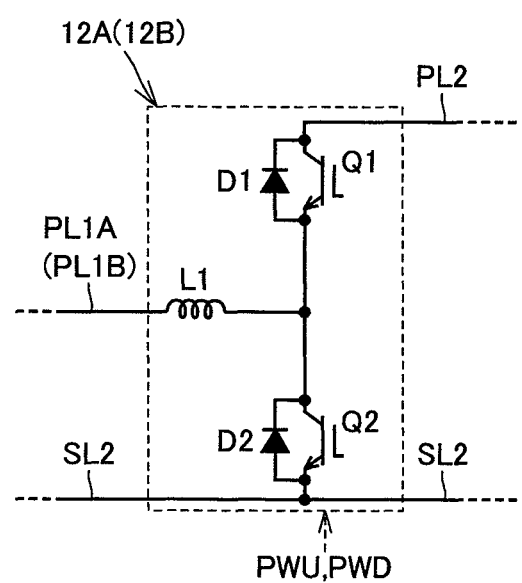
FIG. 3 is a circuit diagram showing in detail a configuration of converters 12A and 12B of FIG. 1.

FIG. 3 is a circuit diagram showing in detail a configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter. Diode D2 has its cathode connected to IGBT device Q2 at the collector and its anode to IGBT device Q2 at the emitter. IGBT devices Q1, Q2 correspond to the upper arm and lower arm, respectively.

Converter 12B shown in FIG. 1 is different from converter 12A in that the former is not connected to power supply line PL1A and instead to power supply line PL1B. However, its internal circuit configuration is similar to converter 12A. Accordingly it will not be described repeatedly in detail. Furthermore, FIG. 3 shows a converter receiving control signals PWU, PWD. This is to avoid complexity. Specifically, as shown in FIG. 1, different control signals PWUA, PWDA, and control signals PWUB, PWDB, are input to converters 12A and 12B, respectively.

In the power supply system of electric powered vehicle 1, power is transmitted and received with respect to motor generators MG1 and MG2 by battery BA (main power storage device) and a selected one of batteries BB1 and BB2 (hereinafter, also referred to as "selected sub power storage device BB").

Control device 30 receives detected values from voltage sensor 10A, temperature sensor 11A and current sensor 9A to set an SOC (BA) indicating the main power storage device's residual capacity, an upper limit on electric power input Win (M) indicating an upper limit value of the charging electric power, and an upper limit on electric power output Wout (M) indicating an upper limit value of electric power discharged therefrom.

Furthermore, control device 30 receives detected values from voltage sensors 10B1, 10B2, temperature sensors 11B1, 11B2 and current sensors 9B1, 9B2 to set an SOC (BB) of the selected sub power storage device BB and upper limits on electric power input and output Win (S) and Wout (S).

Generally, an SOC is indicated by a ratio (%) of each battery's current charged amount to its fully charged state. Furthermore, Win and Wout are indicated as such an upper limit value of electric power that, even when that electric power is discharged for a predetermined period of time (e.g., for approximately 10 seconds), the battery of interest (BA, BB1, BB2) is not overcharged/overdischarged.

Figure 4:
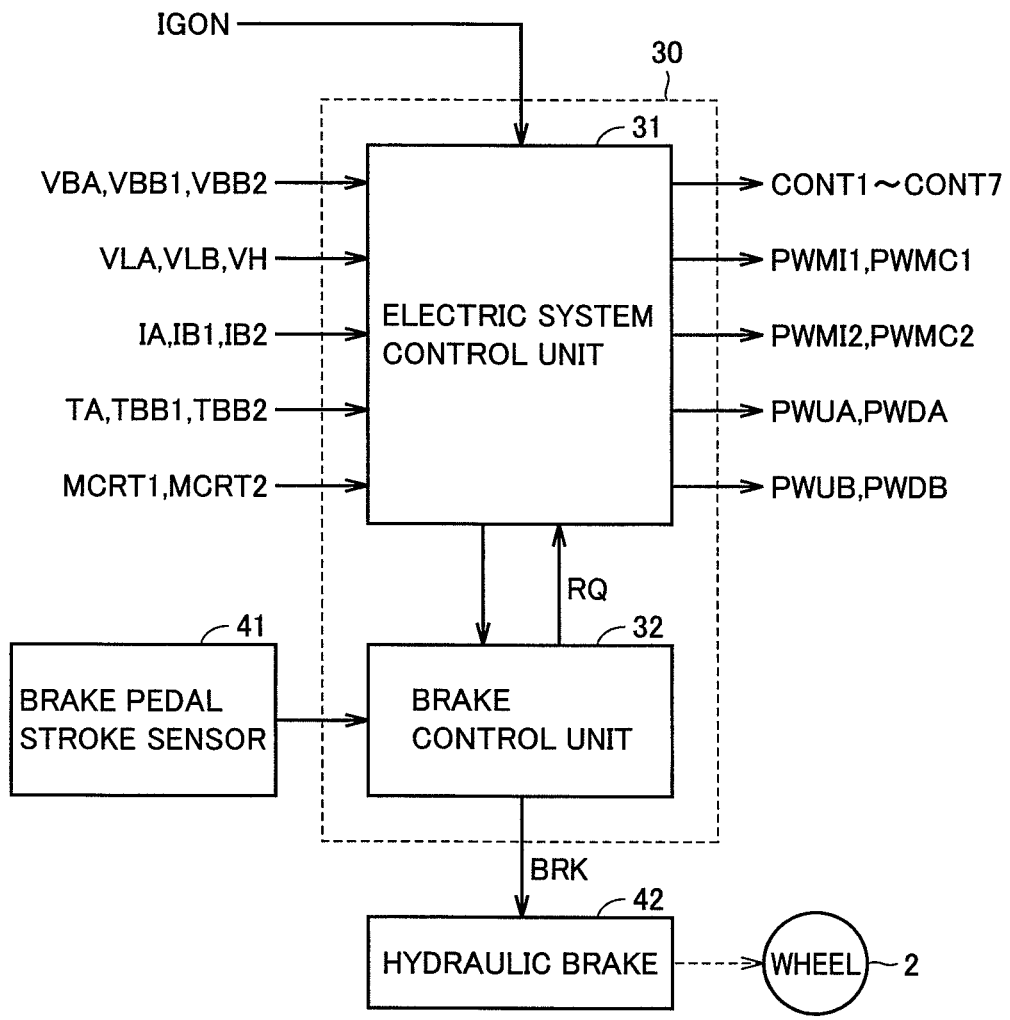
FIG. 4 is a functional block diagram of a control device 30.

FIG. 4 is a functional block diagram of control device 30. Each functional block shown in FIG. 4 is to be implemented by execution of a prestored predetermined program by control device 30, and/or an operational process through electronic circuitry (hardware) in control device 30.

Referring to FIG. 4, control device 30 includes an electric system control unit 31 and a brake control unit 32. Electric system control unit 31 provides the generic control of the electric system shown in FIG. 1. Electric system control unit 31 receives each of voltage values VBA, VBB1, VBB2, VLA, VLB, and VH, each of current values IA, IB1, and IB2, each of temperature values TA, TBB1, and TBB2, as well as motor current values MCRT1 and MCRT2. Electric system control unit 31 outputs relay control signals CONT1-CONT7, and control signals PWMI1, PWMC1, PWMI2, PWMC2, PWUA, PWDA, PWUB, and PWDB.

Brake control unit 32 calculates a regenerative brake required level RQ based on a detection result from brake pedal stroke sensor 41 and outputs a signal BRK to hydraulic brake 42. Electric system control unit 31 executes regenerative braking by controlling motor generator MG2 based on regenerative brake required level RQ.

Figure 5:
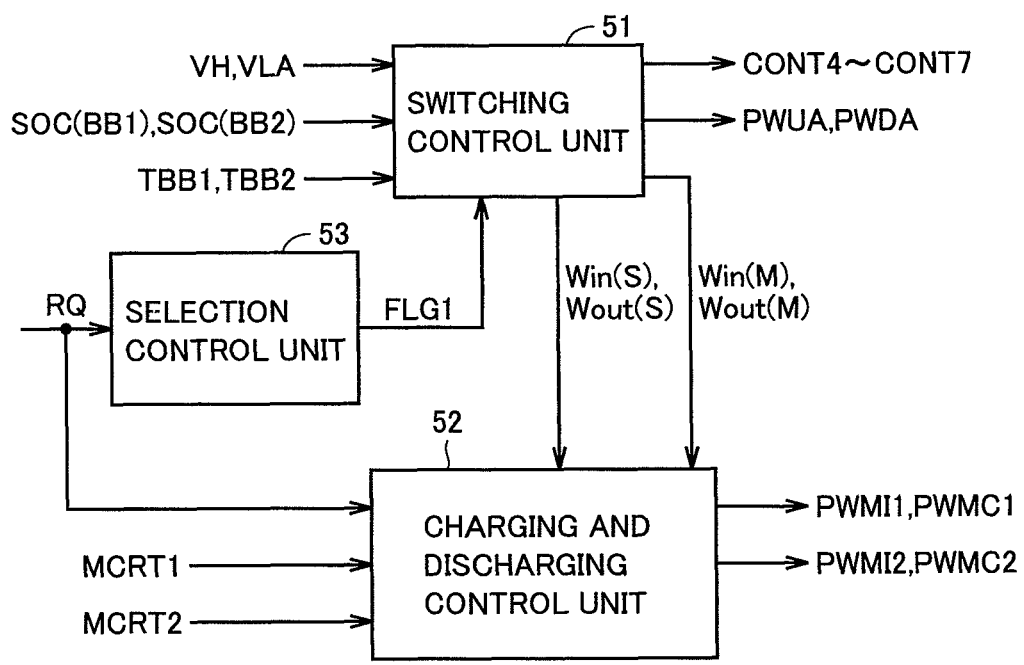
FIG. 5 is a functional block diagram of an electric system control unit 31 of FIG. 4.

FIG. 5 is a functional block diagram of electric system control unit 31 of FIG. 4. Referring to FIG. 5, electric system control unit 31 includes a switching control unit 51, a charging and discharging control unit 52, and a selection control unit 53.

Switching control unit 51 receives the values of voltages VH, VLA, SOC (BB1), and SOC (BB2) as well as the values of temperature TBB1 and TBB2. Then, switching control unit 51 outputs signals CONT4-CONT7 and signal PWUA (or PWDA) to switch the selected sub power storage device. The switching process of a selected sub power storage device will be described in detail afterwards.

Switching control unit 51 receives a flag FLG1 (switching permission flag) indicating permission of switching the selected sub power storage device. When switching of the selected sub power storage device is permitted, flag FLG1 takes an ON state. When switching of the selected sub power storage device is prohibited, flag FLG1 takes an OFF state. Switching control unit 51 executes the switching control set forth above when Flag FLG1 is at the ON state. Switching control unit 51 further outputs Win (M), Wout (M), Win (S), and Wout (S).

Charging and discharging control unit 52 executes the charging and discharging control of the main power storage device and sub power storage device during running of electric powered vehicle 1. Specifically, charging and discharging control unit 52 executes control of power distribution between engine 4 and motor generators MG1, MG2. Charging and discharging control unit 52 receives motor current values MCRT1 and MVCRT2, regenerative brake required level RQ, upper limits on electric power input Win (M), Win (S), and upper limits on electric power output Wout (M), Wout (S) to control the charging and discharging of main power storage device BA and sub power storage devices BB1 and BB2 according to upper limits on electric power input Win (M) and Win (S) or upper limits on electric power output Wout (M) and Wout (S).

Selection control unit 53 sets flag FLG1 at an ON state when regenerative brake required level RQ is received, and sets flag FLG1 at an ON state when regenerative brake required level RQ is not received (including the case where regenerative brake required level RQ is 0). When flag FLG1 is at an ON state, switching control of a selected sub power storage device by switching control unit 51 is permitted. Electric power is not input to the selected sub power storage device since regenerative braking by motor generator MG2 by charging and discharging control unit 52 is not executed.

When flag FLG1 is at an OFF state, switching control of a sub power storage device by switching control unit 51 is prohibited. The selected sub power storage device is charged when regenerative braking (power generation) of motor generator MG 2 by charging and discharging control unit 52 is executed.

Selection control unit 53 executes selection control to prohibit switching control until charging control is completed, when charging control is started first, and to limit charging control until switching control is completed, when switching control is started first.

Figure 6:
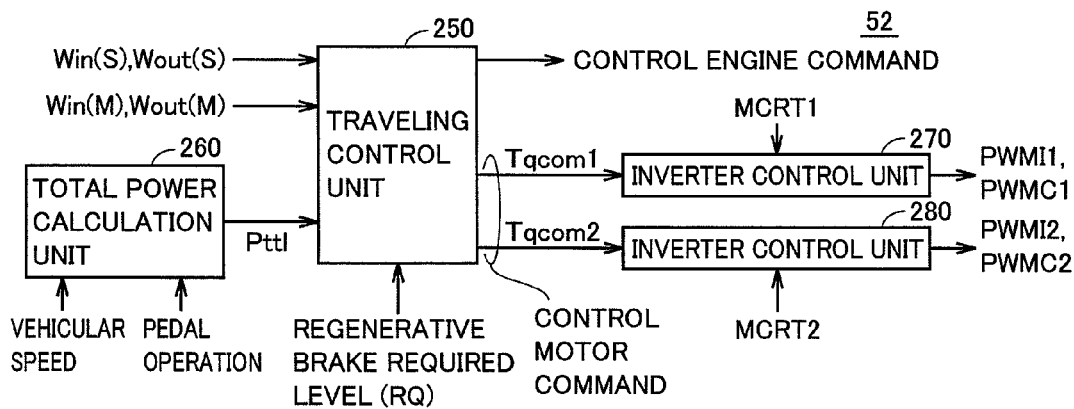
FIG. 6 is a functional block diagram for describing a configuration of charging and discharging control unit 52.

FIG. 6 is a functional block diagram for describing a configuration of charging and discharging control unit 52. Referring to FIG. 6, charging and discharging control unit 52 includes a traveling control unit 250, a total power calculation unit 260, and inverter control units 270 and 280.

Total power calculation unit 260 calculates a total power Ptt1 required for the entirety of electric powered vehicle 1 based on the vehicular speed and pedal operation (accelerator pedal). Total required power Ptt1 may also include the power (engine output) required for generation of battery charging power by motor generator MG1, depending on the status of the vehicle.

Traveling control unit 250 receives upper limits on electric power input/output Win (M), Wout (M) of main power storage device BA and upper limits on electric power input/output Win (S), Wout (S) of selected sub power storage device BB, total required power Ptt1 from total power calculation unit 260, and regenerative brake required level (RQ) corresponding to an operation on the brake pedal. Traveling control unit 250 generates torque command values Tqcom1 and Tqcom2 as motor control commands such that the input/output power at motor generators MG1 and MG2 is, in total, within the charging limit (Win (M)+Win (S)) and discharging limit (Wout (M)+Wout (S)) for main power storage device BA and selected sub power storage device BB. The vehicle driving power by motor generator MG2 and the vehicle driving power by engine 4 are dividedly provided to ensure total required power Ptt1. In particular, vehicle travel control of high fuel efficiency is realized by suppressing the operation of engine 4 by utilizing the power of the externally-charged battery as much as possible, or by setting the vehicle driving power by engine 4 to correspond to a region where engine 4 is operable at high efficiency.

Inverter control unit 270 receives torque command value Tqcom1 and motor current value MCRT1 of motor generator MG1 to generate control signals PWMI1, PWMC1 for inverter 14. Similarly, inverter control unit 280 receives torque command value Tqcom2 and motor current value MCRT2 of motor generator MG2 to generate control signals PWMI2, PWMC2 for inverter 22. Furthermore, traveling control unit 250 generates a control engine command according to a required value of the vehicle driving power by the engine, as set. Furthermore, a control device (an engine ECU) not shown controls the operation of engine 4 in accordance with the control engine command.

Control device 30 (charging and discharging control unit 52) is configured such that, when in a vehicle running mode actively using the battery's electric power (i.e., in an EV mode), and total required power Ptt1 is equal to or smaller than the batteries' total upper limit on electric power output Wout (M)+Wout (S), engine 4 is not operated and motor generator MG2 alone provides power to drive the vehicle. When total required power Ptt1 exceeds Wout (M)+Wout (S), engine 4 is started.

In contrast, when in a running mode in which the EV mode is not selected, i.e., in an HV mode, control device 30 (charging and discharging control unit 52) controls distribution of the driving power between engine 4 and motor generator MG2 such that the batteries' SOC is maintained at a predetermined target value. In other words, the vehicle is controlled to run with engine 4 in a more operable manner than in the EV mode.

In the EV mode, charging and discharging are controlled to preferentially use the electric power of selected sub power storage device BB than that of main power storage device BA. Therefore, when the SOC of selected sub power storage device BB is decreased during vehicle traveling, there is a need to switch selected sub power storage device BB. For example, if battery BB1 is set as selected sub power storage device BB in starting the vehicle, a necessity will arise to subsequently disconnect battery BB1 from converter 12B and connect battery BB2 as a new selected sub power storage device BB to converter 12B, i.e. to execute a connection switching process.

Battery BB2 newly qualified as selected sub power storage device BB generally has an output voltage higher than that of battery BB1 that is previously used. As a result, a problem may arise as to the protection of the equipment by the occurrence of a short-circuit path not intended by the connection of a new high voltage battery. Therefore, sufficient attention must be exercised in the connection switching process of a sub power storage device to prevent occurrence of a short-circuit path. Further, since supply and collection of electric power by selected sub power storage device BB are not allowed during the connection switching process set forth above, the charging and discharging must be limited such that overcharging and overdischarging at the overall power supply system will not occur during the relevant period.

A sub power storage device connection switching process in view of this issue will be described hereinafter. The "connection switching process" corresponds to "switching control" set forth above.

Figure 7:
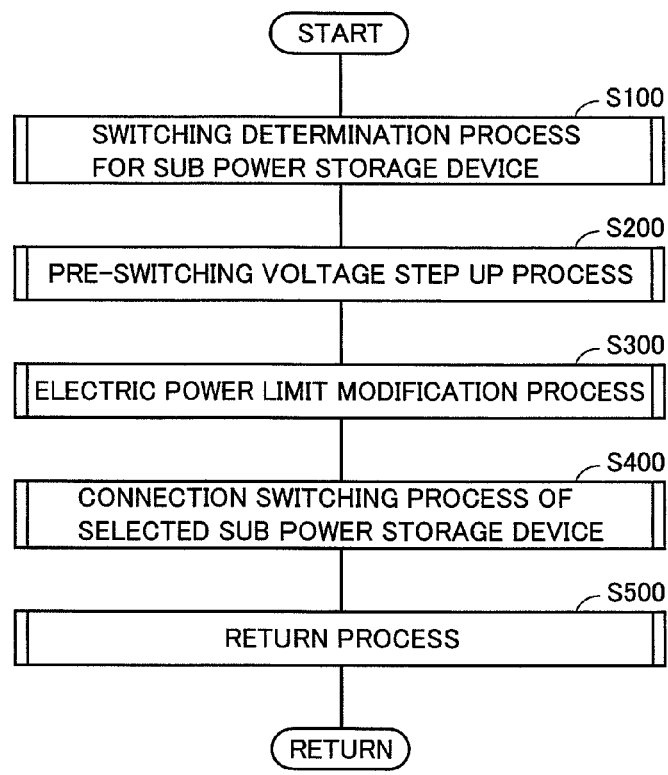
FIG. 7 is a flowchart of a general procedure of a selected sub power storage device switching process at a power supply system in the electric powered vehicle according to the first embodiment of the present invention.

FIG. 7 is a flowchart of a general procedure of a selected sub power storage device switching process in a power supply system of an electric powered vehicle according to the first embodiment of the present invention. FIGS. 8-12 are flowcharts for describing in detail steps S100, S200, S300, S400 and S500, respectively, of FIG. 7.

Control device 30 (switching control unit 51) can repeatedly execute the control process procedure according to the flowcharts of FIGS. 7-12 periodically as predetermined by executing a prestored predetermined program periodically as predetermined. Accordingly, a connection switching process of a sub power storage device (switching control) in the power supply system of the electric powered vehicle according to an embodiment of the present invention can be realized.

Referring to FIG. 7, switching control unit 51 executes a switching determination process of the selected sub power storage device at step S100. When determination is made that switching of the selected sub power storage device is required, steps S200-S500 set forth below is executed. When determination is made that switching of the selected sub power storage device is not required at step S100, steps S200-S500 are substantially not executed.

Switching control unit 51 executes a pre-switching voltage step-up process at step S200, and executes an electric power limit modification process at step S300 such that an excessive charging/discharging request is not generated to the power supply system during a connection switching period of a sub power storage device. Control device 30 executes a process of actually switching selected sub power storage device BB from converter 12B, i.e. a connection switching process, at step S400. At step S500 following completion thereof, a return process is executed to start electric power supply by a new selected sub power storage device.

Figure 8:
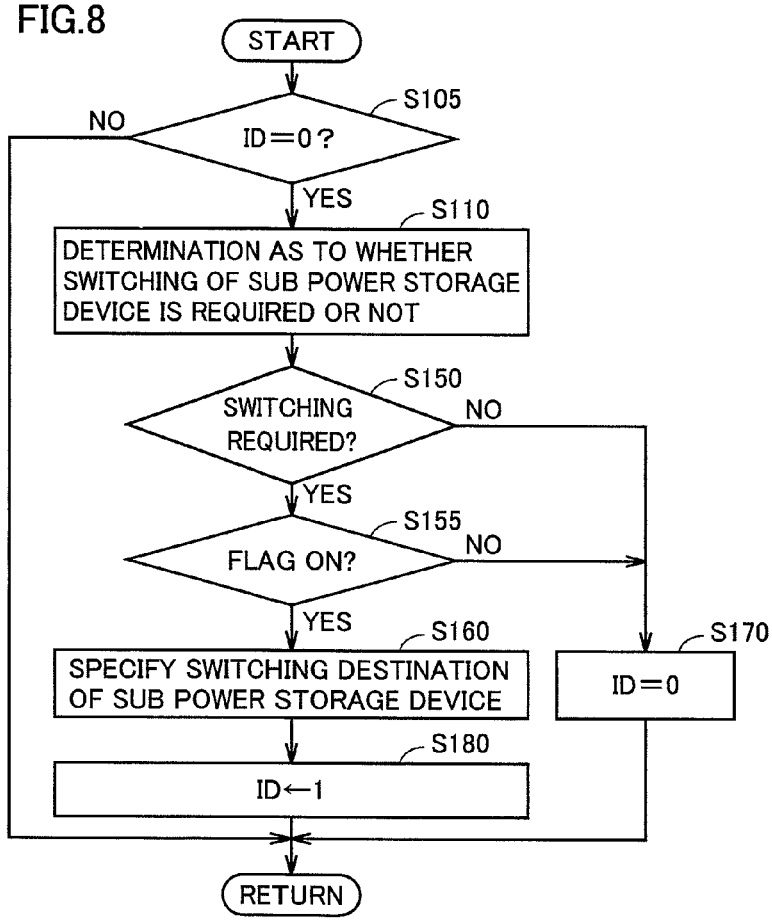
FIG. 8 is a flowchart for describing in detail the selected sub power storage device switching determination process (S100) of FIG. 7.

FIG. 8 is a flowchart for describing in detail a switching determination process for a selected sub power storage device of FIG. 7 (S100).

As will be described hereinafter, a variable ID representing the progress status of a connection switching process is introduced. Variable ID is set to −1 or any of 0 to 4. ID=0 represents a state in which a switching request of a sub power storage device is not generated. Specifically, when ID=0, power supply by a currently selected sub power storage device BB is executed while determination as to whether switching of selected sub power storage device BB is required or not is made periodically as determined. When there is no new available sub power storage device in the event of failure in the device or by depletion of the battery power, ID=−1 will be set.

Referring to FIG. 8, switching control unit 51 determines whether ID=0 or not at step S105. When ID=0 (YES at step S105), switching control unit 51 proceeds to step S110 to execute determination as to whether switching of the selected sub power storage device is required or not. Determination at step S110 is executed basically based on the SOC of the current selected sub power storage device BB. In other words, determination is made that switching of the selected sub power storage device is required when the SOC of the currently-used sub power storage device is lower than a predetermined determination value.

At step S150, switching control unit 51 confirms the determination result of whether switching is required or not made at step S110. When determination is made that switching is required (YES at step S150), switching control unit 51 proceeds to step S155 to determine whether flag FLG1 (switching permission flag) is ON or not. When flag FLG1 is at an ON state (YES at step S155), switching control unit 51 proceeds to step S160 to specify a selected sub power storage device BB to be newly used. In the case where two batteries BB1 and BB2 are mounted as the sub power storage devices, as shown in FIG. 1, the new selected sub power storage device BB is determined automatically without having to perform the process of step S160. However, in the case where three or more sub power storage devices BB1 to BBn (n: an integer of three or higher) to be selected are mounted in the configuration of FIG. 1, a new sub power storage device that is to be used next is specified based on the SOC or the like of each of the sub power storage devices not currently used. Then, switching control unit 51 sets ID=1 to proceed with the connection switching process. In other words, ID=1 represents the state in which a switching request of selected sub power storage device BB is generated and a switching process is started.

When determination is made at step S110 that switching of the selected sub power storage device is not required (NO at step S150), switching control unit 51 proceeds to step S170 to maintain ID=0. Furthermore, when flag FLG1 is at an OFF state (NO at step S155), switching control unit 51 proceeds to step S170 to maintain ID=0. When ID≥1 and a switching process is started, or when ID=−1 is set since there is no newly available sub power storage device, the processes of steps S110-S180 are skipped.

Figure 9:
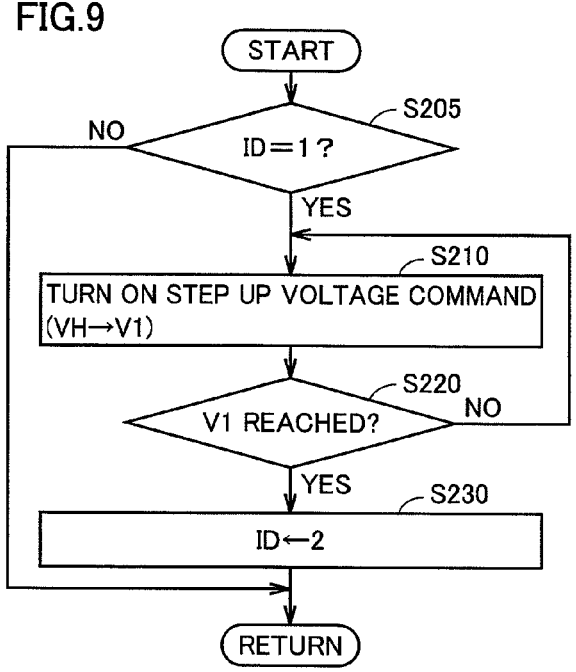
FIG. 9 is a flowchart for describing in detail a pre-switching voltage step-up process (S200) shown in FIG. 7.

FIG. 9 is a flowchart for describing in detail a pre-switching voltage step-up process (S200) shown in FIG. 7.

Referring to FIG. 9, switching control unit 51 confirms whether ID=1 at step S205 in the pre-switching voltage step-up process. When ID=1 corresponding to a state where a switching request of selected sub power storage device BB is made and a switching process is started (YES at step S205), switching control unit 51 proceeds to step S210 to generate a step-up voltage command for converter 12A such that voltage VH at electric power feeding line PL2 is stepped up to a predetermined voltage V1. In response to the step-up voltage command, voltage command value VHref=V1 is set for electric power feeding line PL2, and a control signal PWUA for converter 12A is generated to realize the relevant voltage command value.

Predetermined voltage V1 is set higher than any higher one of the output voltages from main power storage device BA and newly selected sub power storage device BB (for example BB2). By setting predetermined voltage V1 at a controlled upper limit voltage VHmax that can be stepped up by converter 12A, for example, voltage VH at the time of a voltage step-up command can be reliably set higher than the output voltages from both main power storage device BA and selected sub power storage device BB subsequent to switching. Alternatively, from the standpoint of reducing loss at converter 12A, a predetermined voltage V1 may be determined on a case-by-case basis to have a margin relative to the output voltages of main power storage device BA and selected sub power storage device BB subsequent to switching at that point of time.

When a voltage step-up command is generated at step S210, switching control unit 51 proceeds to S220 to determine whether voltage VH has reached predetermined voltage V1 based on the detected value from voltage sensor 13. For example, a YES determination is made at step S220 when VH>V1 continues for a predetermined time.

When voltage VH reaches predetermined voltage V1 (YES at step S220), switching control unit 51 advances the ID to 2 from 1. Until voltage VH reaches the level of V1 (NO at step S220), ID=1 is maintained. In other words, ID=2 represents a state in which the pre-switching voltage step-up process has ended and the switching process can further proceed. When ID≠1 (NO at step S205) the subsequent processes of steps S210-S230 are skipped.

Figure 10:
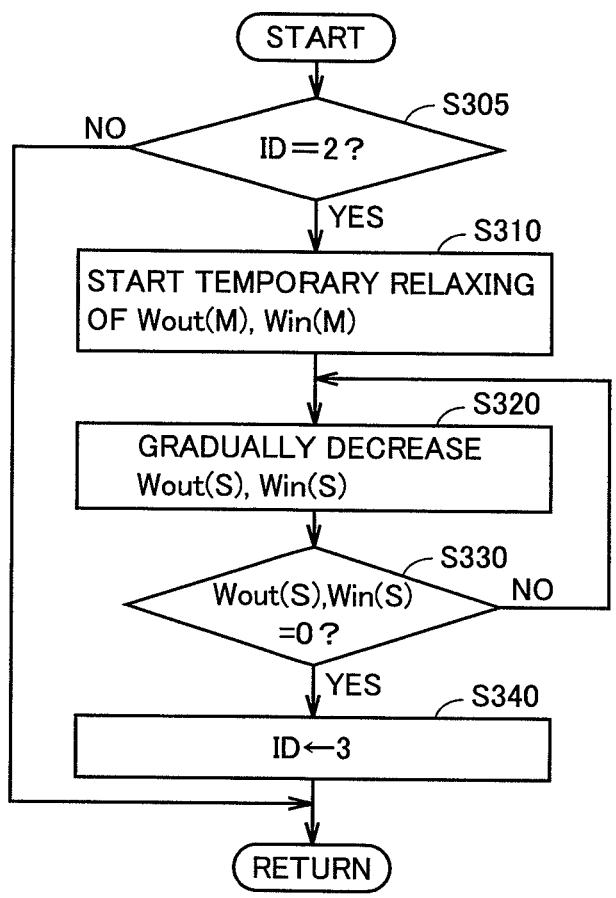
FIG. 10 is a flowchart for describing in detail an electric power limit modification process (S300) shown in FIG. 7.

When the pre-switching voltage step-up process (step S200) ends, switching control unit 51 executes an electric power limit modification process as shown in FIG. 10.

FIG. 10 is a flowchart for describing in detail an electric power limit modification process (S300) shown in FIG. 7.

Referring to FIG. 10, switching control unit 51 in the electric power limit modification process first determines whether ID=2 at step S305. When not at ID=2 (NO at step S305), the processes of subsequent steps S310-S340 are skipped.

When ID=2 (YES at step S305), switching control unit 51 proceeds to step S310 to start relaxing the charging/discharging limitation of main power storage device BA temporarily. Specifically, the absolute values of upper limit on electric power input/output Win (M) and Wout (M) of main power storage device BA are temporarily increased.

At step S320, switching control unit 51 gradually decreases the absolute values of upper limits on electric power input/output Win (S) and Wout (S) of selected sub power storage device BB. For example, Wout (S) and Win (S) are gradually decreased towards 0 at a predetermined fixed rate.

At step S330, switching control unit 51 determines whether Wout (S), Win (S) have reached 0. Until Wout (S)=Win (S)=0 is established, step S320 is executed repeatedly, and Wout (S) and Win (S) are continuously decreased.

When Wout (S) and Win (S) reach 0 (YES at step S330), switching control unit 51 proceeds to step S340 to set the ID to 3 from 2. In other words ID=3 represents the state in which the pre-switching voltage step-up process and electric power limit modification process have ended, and the connection switching of sub power storage devices BB1 and BB2 with converter 12B can be started.

When the electric power limit modification process shown in FIG. 10 ends, switching control unit 51 executes the connection switching process of a sub power storage device at step S400

By temporarily relaxing the upper limit on electric power input/output of the main power storage device and setting the upper limit on electric power input/output of the selected sub power storage device at 0, electric power can be transmitted and received between main power storage device BA and motor generator MG2. Therefore, a state in which the electric power, even when generated by the regenerative braking of motor generator MG2, is not input to selected sub power storage device BB can be achieved. Further, a request of excessive charging/discharging with respect to the power supply system can be suppressed. Further, the internal combustion engine can be prevented from being started newly at the time of switching the connection of the sub power storage device by virtue of temporarily relaxing the charging/discharging limitation of the main power storage device.

Figure 11:
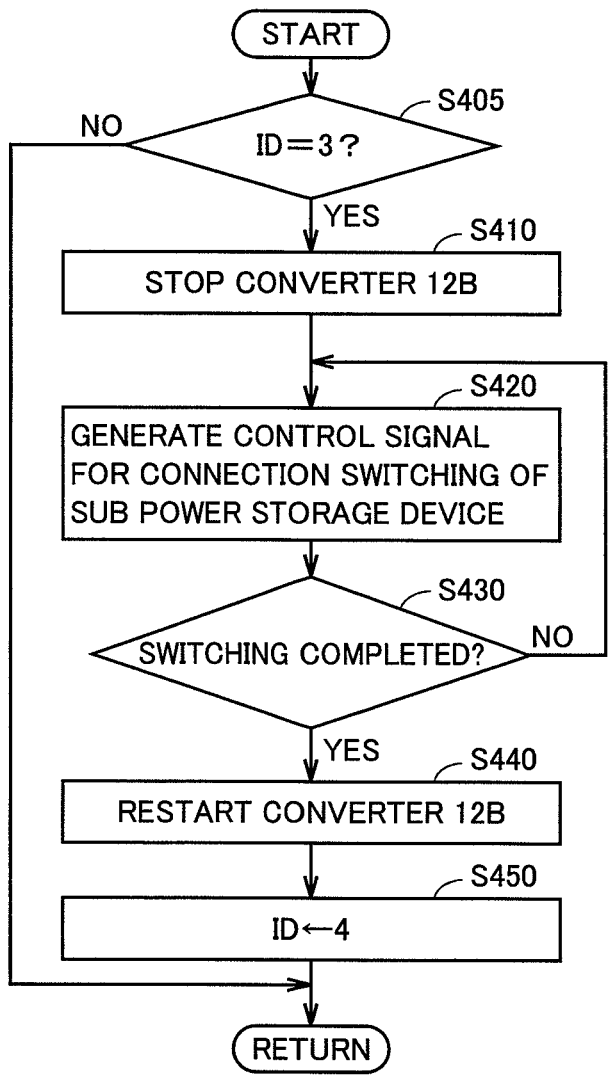
FIG. 11 is a flowchart for describing in detail a sub power storage device connection switching process (S400) shown in FIG. 7.

FIG. 11 is a flowchart for describing in detail a sub power storage device connection switching process (S400) shown in FIG. 7.

Referring to FIG. 11, switching control unit 51 in a sub power storage device connection switching process first determines whether ID=3 or not at step S405. When ID≠3 (NO at step S405), the processes of subsequent steps S410-S450 are skipped.

When ID=3 (YES at step S405), switching control unit 51 proceeds to step S410 to stop converter 12B as a preparation for a sub power storage device connection switching. Namely, in response to a shutdown command, converter 12B has IGBT devices Q1 and Q2 forced to an OFF state. Then, switching control unit 51 proceeds to step S420 to generate a relay control signal to actually switch the connection of a sub power storage device. For example, in order to disconnect battery BB1 from converter 12B and connect battery BB2 with converter 12B, relay control signals CONT4 and CONT6 are generated to turn off relays SR1 and SR1G, and relay control signals CONT5 and CONT7 are generated to turn on relays SR2 and SR2G.

Then, switching control unit 51 proceeds to step S430 to determine whether the relay connection switching instructed at step S420 is completed or not. When the connection switching is completed (YES at step S430), switching control unit 51 proceeds to step S440 to restart converter 12B to initiate a switching operation, and then proceeds to step S450 to set the ID to 4 from 3.

In other words, ID=4 represents the state in which the connection switching between a sub power storage device and converter 12B by a relay is completed.

When the connection switching process at step S400 ends, switching control unit 51 executes a return process of step S500.

Figure 12:
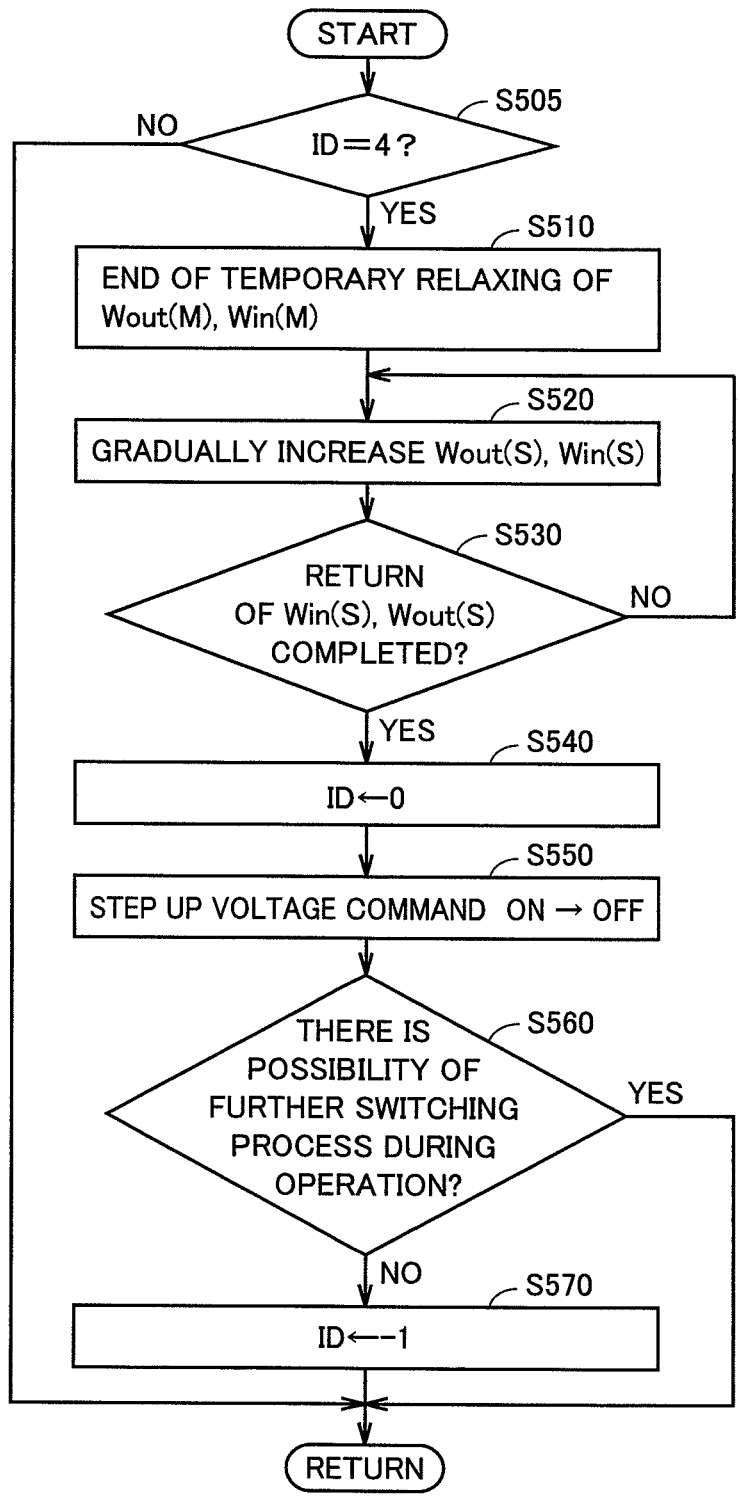
FIG. 12 is a flowchart for describing in detail a return process (S500) shown in FIG. 7.

FIG. 12 is a flowchart for describing in detail the return process (S500) shown in FIG. 7.

Referring to FIG. 12, switching control unit 51 in a return process first determines whether ID=4 or not at step S505. When ID≠4 (NO at step S505), the processes of subsequent steps S510-S570 are skipped.

When ID=4 (YES at step S505), switching control unit 51 proceeds to step S510 to end the temporary relaxing of the charging/discharging of main power storage device BA started at step S310 (FIG. 10). Accordingly, Wout (M) and Win (S) basically return to the values prior to starting the selected sub power storage device switching process.

Further, switching control unit 51 gradually increases upper limits on electric power input/output Win (S) and Wout (S) of selected sub power storage device BB that were decreased down to 0 by the electric power limit process (step S300), to the level of Win and Wout of the new selected sub power storage device (for example, battery BB2).

Then, switching control unit 51 proceeds to step S530 to confirm whether the upper limits on electric power input/output Win (S) and Wout (S) have returned to the values of Win and Wout of new selected sub power storage device BB. Step S520 is repeatedly executed until the return process is completed (NO at step S530), so that the values of upper limits on electric power input/output Win (S) and Wout (S) gradually become higher at a fixed rate.

When the return of upper limits on electric power input/output Win (S) and Wout (S) is completed (YES at S530), switching control unit 51 proceeds to step S540 to set the ID to 0 again. Accordingly, the power supply system returns to a state in which the normal electric power feeding and collection by main power storage device BA and new selected sub power storage device BB are allowed.

Then, switching control unit 51 proceeds to step S550 to turn off the voltage step-up command generated at step S210 (FIG. 9). Accordingly, the voltage command value of electric power feeding line PL2 attains the normal value set corresponding to the state of motor generators MG1 and MG2.

When the series of the switching process is completed, switching control unit 51 proceeds to step S560 to determine whether there is a possibility of further switching a selected sub power storage device during running of the vehicle. When there is no possibility of further switching, switching control unit 51 proceeds to step S570 to set ID=−1. Since each of steps S100-S500 of FIG. 7 is not substantially executed when ID=−1, a switching process of a selected sub power storage device will not be started until the operation of the vehicle ends.

When there is a possibility of further switching, switching control unit 51 skips step S570 and maintains ID=0. As a result, the switching determination process of step S100 is executed periodically as predetermined. A switching process of a selected sub power storage device will be started again, if necessary.

In the exemplified configuration of FIG. 1 where only two sub power storage devices are mounted, the process of step S560 can be omitted by always taking ID=−1 when a selected sub power storage device switching process is once completed to limit the selected sub power storage device switching process during vehicle operation to only once.

Alternatively, in a power supply system incorporating three or more sub power storage devices or in a power supply system based on a configuration in which a sub power storage device not currently used can be charged during vehicle operation, a configuration may be allowed to execute the next second and subsequent selected sub power storage device switching process by maintaining ID=0 according to the state.

Figure 13:
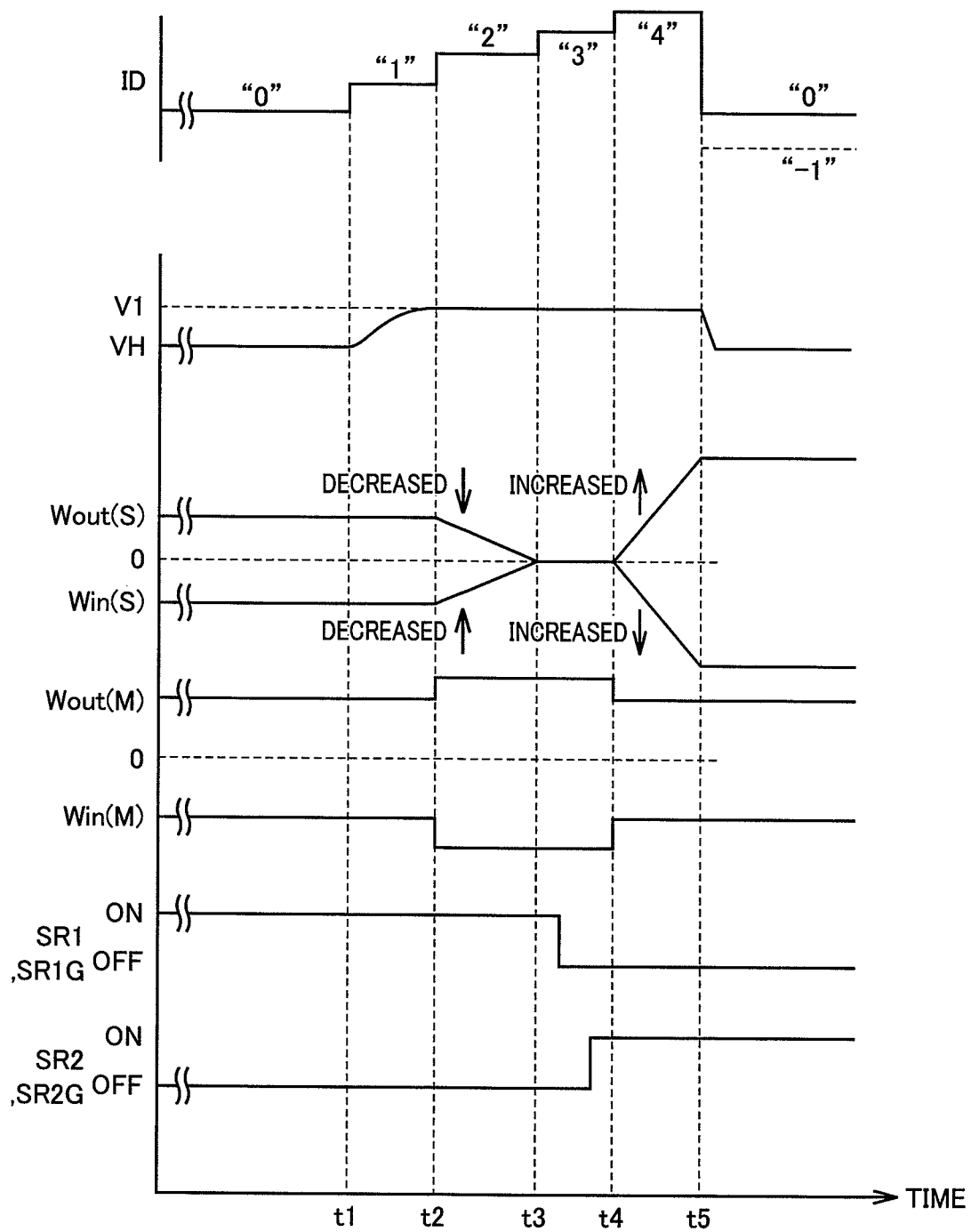
FIG. 13 is an operation waveform diagram in a selected sub power storage device switching process at a power supply system of the electric powered vehicle according to the first embodiment.

FIG. 13 represents an operation waveform of a selected sub power storage device switching process in a power supply system of the electric powered vehicle according to the first embodiment described with reference to FIGS. 7-12.

Referring to FIG. 13, until time t1 where ID=0, a switching determination process is executed periodically as predetermined based on the SOC of the current selected sub power storage device (for example, battery BB1). It is assumed that switching of a selected sub power storage device is permitted by flag FLG1 taking an ON state.

At time t1, a switching request of selected sub power storage device BB is issued by the switching determination process (step S100) in response to reduction in the SOC of battery BB1. A switching process is started by the setting of ID=1.

Accordingly, a pre-switching voltage step-up process (step S200) is executed. Voltage VH at electric power feeding line PL2 is stepped up towards predetermined voltage V1 by converter 12A. When the voltage step-up process of electric power feeding line PL2 is completed at time t2, the ID is modified from 1 to 2.

When ID=2, an electric power limit modification process (S300) is executed. The charging/discharging of main power storage device BA is temporarily relaxed. In other words, temporary increase of the absolute values of upper limits on electric power input/output Win (M) and Wout (M) is started. Further, the upper limits on electric power input/output Win (S) and Wout (S) of selected sub power storage device BB are gradually decreased towards 0 at a fixed rate. During this period, converter 12B is controlled such that charging/discharging of current selected sub power storage device (battery BB1) is stopped. Alternatively, converter 12B can be shut down from time t1.

At time t3, when upper limits on electric power input/output Win (S) and Wout (S) of selected sub power storage device BB are decreased down to 0, the ID is modified from 2 to 3. When ID=3, a sub power storage device connection switching process is started. Specifically, relays SR1 and SR1G are turned off under the state where converter 12B is shut down, and then relays SR2 and SR2G are turned on. When the relay connection switching process is completed and battery BB2 is connected to converter 12B as the new selected sub power storage device, converter 12B is restarted.

By the completion of the connection switching process, the ID is modified from 3 to 4 at time t4.

When ID=4, the usage of battery BB2 identified as the new selected sub power storage device is started by the gradual increase of upper limits on electric power input/output Win (S) and Wout (S) of selected sub power storage device BB at a fixed rate. Accordingly, the temporary relaxing of the charging/discharging limitation of main power storage device BA ends. The values of Wout (M) and Win (M) are returned to the values basically before time t2.

At time t5 when Win (S) and Wout (S) of selected sub power storage device BB return to the former value corresponding to Wout and Win of battery BB2, the ID is returned to 0. The voltage step-up process of electric power feeding line PL2 is also stopped.

Thus, the series of selected sub power storage device switching process ends, returning to a state allowing normal power feeding and collection using selected sub power storage device BB (battery BB2).

As described in FIG. 12, when determination is made as to whether there is a possibility of a further sub power storage device switching process during vehicle operation at time t5, and taking ID=1 when there is no possibility of generation of a switching process, the subsequent load on control device 30 can be reduced.

Figure 14:
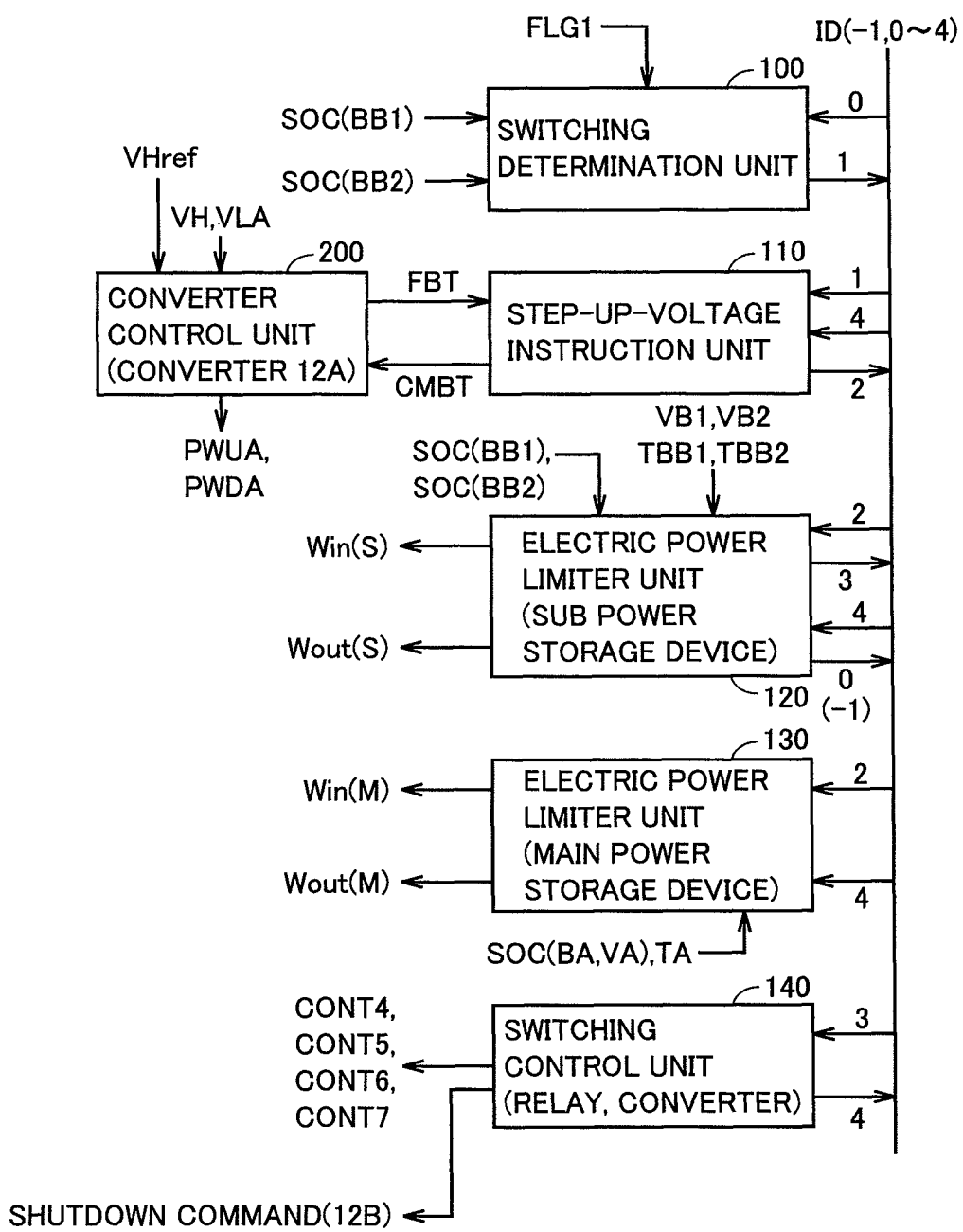
FIG. 14 is a functional block diagram for describing a configuration of a switching control unit 51.

A configuration of switching control unit 51 will be described hereinafter based on FIG. 14. Referring to FIG. 14, switching control unit 51 includes a switching determination unit 100, a step-up-voltage instruction unit 110, electric power limiter units 120 and 130, a connection control unit 140, and a converter control unit 200. Switching determination unit 100 receives SOC (BB1) and SOC (BB2) indicating the state of charge of batteries BB1 and BB2 to determine whether the SOC of selected sub power storage device BB currently used is lower than a predetermined determination value. Switching determination unit 100 executes the determination process set forth above periodically as predetermined when variable ID shared between respective functional blocks is 0.

Switching determination unit 100 modifies the ID from 0 to 1 when switching of a selected sub power storage device is required and flag FLG1 is at an ON state. In response, a selected sub power storage device switching request is issued. The function of switching determination unit 100 corresponds to the process of step S100 in FIG. 7.

When ID=1 corresponding to generation of a switching request of a selected sub power storage device, step-up-voltage instruction unit 110 issues a voltage step-up command signal CMBT to converter control unit 200 that controls converter 12A.

Converter control unit 200 generates control signals PWUA and PWDA of converter 12A such that voltage VH of electric power feeding line PL2 attains a voltage command value VHref, based on voltages VH and VLA as well as voltage command value VHref.

When a voltage step-up command signal CMBT is generated from step-up-voltage instruction unit 110, converter control unit 200 sets voltage command value VHref=V1 and generates control signal PWUA. Then, converter control unit 200 sets flag FBT indicating voltage step-up completion at an ON state when the state of voltage VH detected by voltage sensor 13 reaching the level of predetermined voltage V1 continues for more than a predetermined period.

Step-up voltage instruction unit 110 modifies the ID to 2 when flag FBT is ON. An output of voltage step-up command signal CMBT is continued until ID=4 is set by the completion of a relay connection switching by connection control unit 140 described afterwards. In other words, the function of step-up voltage instruction unit 110 corresponds to the process of step S200 in FIG. 7 and step S540 in FIG. 12.

Electric power limiter unit 120 sets upper limits on electric power input/output Win (S) and Wout (S) of selected sub power storage device BB. In a normal mode, upper limits on electric power input/output Win (S) and Wout (S) are set based on the SOC of the battery identified as selected sub power storage device BB (SOC (BB1) or SOC (BB1)), battery temperature (TBB1 or TBB2), and output voltage (VB1 or VB2).

In a selected sub power storage device switching process, electric power limiter unit 120 responds to the setting of ID=2 to gradually decrease upper limits on electric power input/output Win (S) and Wout (S) to 0. When Win (S) and Wout (S) reach 0, the ID is set to 3 from 2. When ID=4 is set by connection control unit 140, electric power limiter unit 120 increases upper limits on electric power input/output Win (S) and Wout (S) to values corresponding to Win, Win of new selected sub power storage device BB subsequent to switching. When the voltage step-up process is completed, the ID is modified from 4 to 0.

In other words, the function of electric power limiter unit 120 corresponds to the processes of steps S320-S340 in FIG. 10 and steps S520-S540 in FIG. 12.

Electric power limiter unit 130 sets upper limits on electric power input/output Win (M) and Wout (M) of main power storage device BA. In a normal mode, upper limits on electric power input/output Win (M) and Wout (M) are set based on the SOC (BA) of main power storage device BA, battery temperature TA, and output voltage VA.

In a selected sub power storage device switching process, electric power limiter unit 130 responds to the setting of ID=2 to temporarily increase the absolute values of upper limits on electric power input/output Win (M) and Wout (M) to temporarily relax the charging/discharging limitation of main power storage device BA. When ID=4 is set by connection control unit 140, electric power limiter unit 130 returns upper limits on electric power input/output Win (M) and Wout (M) to normal values.

Namely, the function of electric power limiter unit 130 corresponds to the processes of step S310 of FIG. 10 and step S510 of FIG. 12.

When ID=3 is set by electric power limiter unit 120, connection control unit 140 generates a shutdown command of converter 12B, and also generates relay control signals CONT4-CONT7 so as to switch the connection of converter 12B with sub power storage devices BB1 and BB2. In the case where selected sub power storage device BB is switched from battery BB1 to battery BB2, for example, relay control signals CONT4-CONT7 are generated such that relays SR1 and SR1G are turned off while relays SR2 and SR2G are turned on. When the relay connection switching process is completed, the aforementioned shutdown command is stopped. Converter 12B is restarted and the ID is modified from 3 to 4.

The function of connection control unit 140 corresponds to the process of step S400 of FIG. 7 (S405-S450) of FIG. 9).

Figure 15:
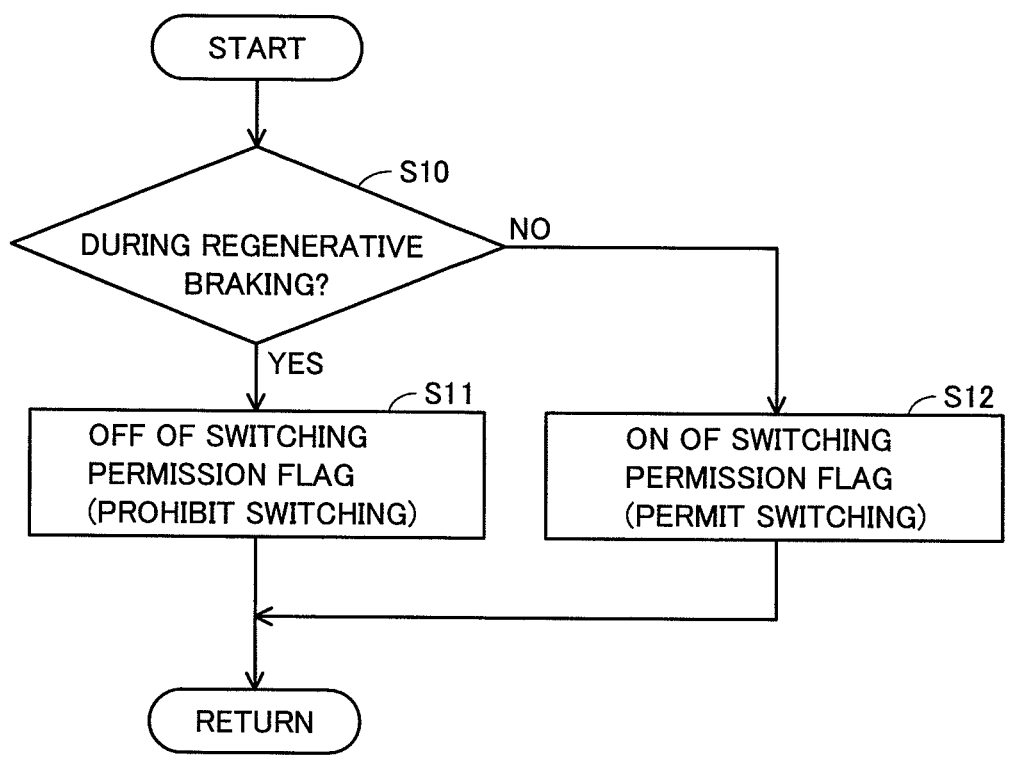
FIG. 15 is a flowchart for describing a flag setting process by a selection control unit 53 of FIG. 5.

FIG. 15 is a flowchart for describing a flag setting process by selection control unit 53 of FIG. 5. Control device 30 (selection control unit 51) can repeatedly execute the control process procedure according to the flowchart of FIG. 15 periodically as predetermined by executing a prestored predetermined program periodically as predetermined. This flag setting process corresponds to "selection control" set forth above.

Referring to FIG. 15, selection control unit 53 determines whether a regenerative braking of motor generator MG2 is currently executed or not at step S10. Selection control unit 53 determines that regenerative braking of motor generator MG2 is currently executed when regenerative brake required level RQ takes a value other than 0, and determines that regenerative braking of motor generator MG2 is not executed when regenerative brake required level RQ is 0. When determination is made that regenerative braking is currently executed (YES at step S10), selection control unit 53 proceeds to step S11 to set flag FLG1 (switching permission flag) off. In other words, selection control unit 53 prohibits switching of a selected sub power storage device. When determination is made that regenerative braking is not executed (NO at step S10), selection control unit 53 proceeds to step S12 to set flag FLG1 at an ON state. In other words, selection control unit 53 permits switching of the selected sub power storage device.

Switching of a selected sub power storage device is prohibited during execution of regenerative braking Accordingly, stable regenerative braking can be realized. This will be described in detail.

Figure 16:
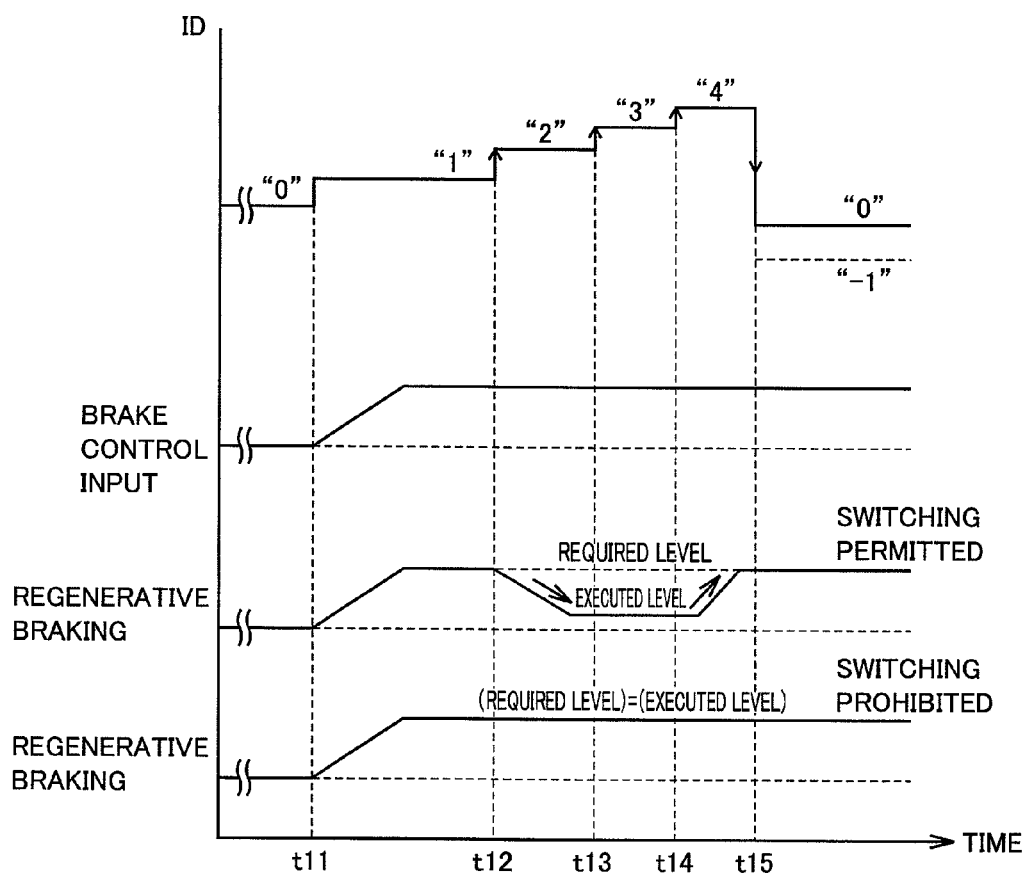
FIG. 16 is a diagram representing the relationship between a brake control input by the user and regenerative braking

FIG. 16 is a diagram to describe the relationship between the brake control input by the user and regenerative braking Referring to FIG. 16, it is assumed that the user operates the brake pedal during the period of ID=1 (the period from time t11 to time t12). It is assumed that the brake pedal control input is increased from time t11 and maintained at a certain value.

During the period when the ID is 2 to 4, the executed level of regenerative braking becomes lower since the upper limit on electric power input of the selected sub power storage device is decreased. Specifically, during the period of ID=2 (the period from time t12 to time t13), the upper limits on electric power input/output of the selected sub power storage device are gradually decreased. Accordingly, the executed level of regenerative braking is also gradually decreased. During the period of ID=3 (the period from time t13 to time t14), the upper limits on electric power input/output of the selected sub power storage device become 0. Since only main power storage device BA receives the power generated by motor generator MG2 during the period, the regenerative brake executed level is decreased. During the period of ID=4 (the period from time t14 to time t15), the regenerative brake executed level is gradually increased to become equal to the required level.

An approach can be considered to alter the regenerative brake executed level as shown in FIG. 16 and compensate for the reduction in the regenerative brake executed level by a hydraulic brake. However, the response of the hydraulic brake is generally lower as compared to regenerative braking Therefore, in the case where the braking force of the hydraulic brake is increased according to the start of reduction in the regenerative brake required level, there is a possibility of the driver having the impression of change in the behavior of the vehicle (for example, impression of weaker brake efficiency).

According to the first embodiment, switching of a selected sub power storage device is prohibited during regenerative braking by motor generator MG2 (power generation by motor generator MG2). In other words, selection control unit 53 sets flag FLG1 at an OFF state. Accordingly, since electric power corresponding to the regenerative brake required level is received at both the main power storage device and selected sub power storage device, the regenerative brake executed level can be made to match the regenerative brake required level. Thus, stable regenerative braking can be realized.

In the case where regenerative braking by the motor generator MG2 is executed in the first embodiment, i.e., when motor generator MG2 is generating power, switching of a selected sub power storage device is prohibited. More specifically, when the electric power generated by the regenerative braking of motor generator MG2 is input to a sub power storage device, switching from that sub power storage device to another sub power storage device is prohibited. When regenerative braking by motor generator MG2 is not executed (when motor generator MG2 is not generating power), switching of the selected sub power storage device is permitted. By prohibiting switching of a selected sub power storage device when regenerative braking by motor generator MG2 is executed, the electric power generated by regenerative braking of motor generator MG2 can be received at both the main power storage device and sub power storage device. Thus, stable regenerative braking can be realized.

[Second Embodiment]

Referring to FIG. 1, an electric powered vehicle 1A according to a second embodiment of the present invention differs from electric powered vehicle 1 in that a control device 30A is incorporated instead of control device 30. The configuration of the remaining elements of electric powered vehicle 1A is similar to the configuration of the corresponding elements in electric powered vehicle 1. Therefore, control device 30A will be described in detail hereinafter.

Figure 17:
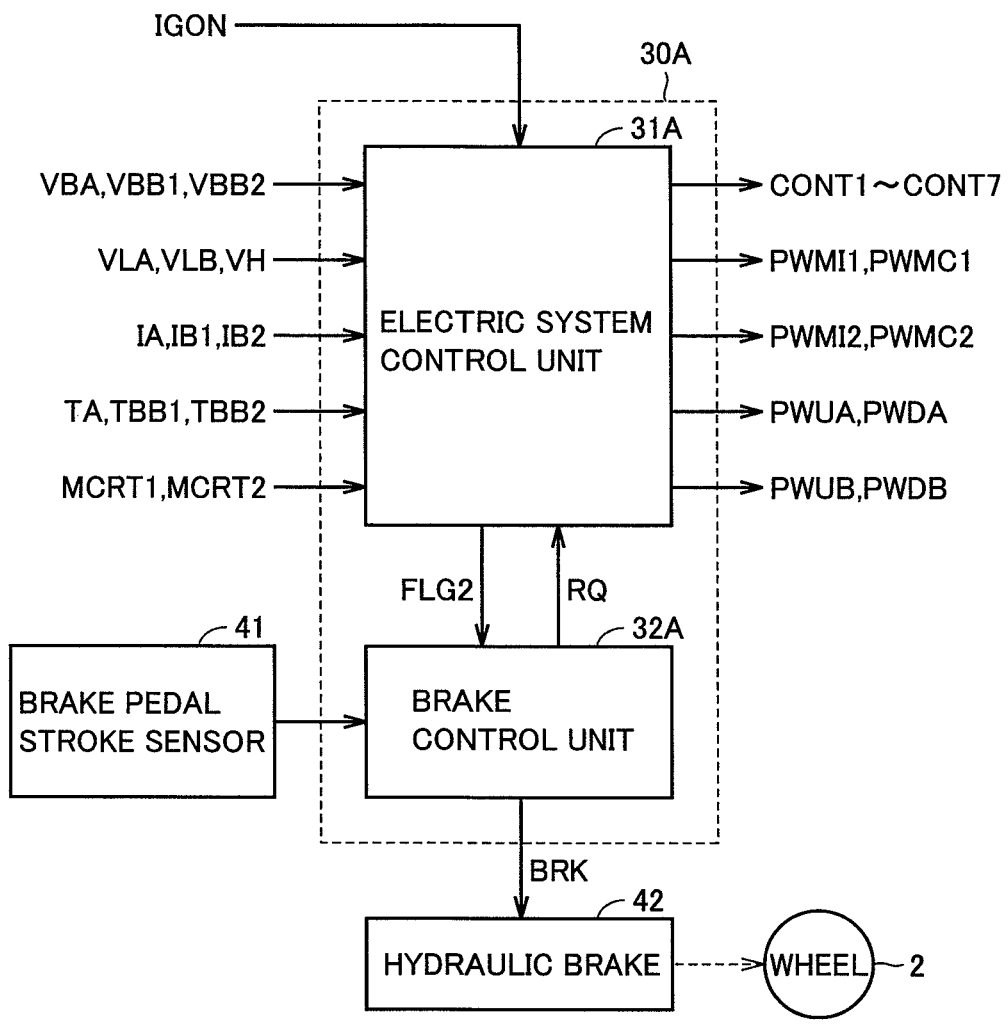
FIG. 17 is a functional block diagram for describing a configuration of a control device 30A.

FIG. 17 is a functional block diagram for describing a configuration of control device 30A. It is assumed that each functional block shown in FIG. 17 is implemented by execution of a prestored predetermined program by control device 30A and/or by an operational process through electronic circuitry (hardware) in control device 30A. Referring to FIG. 17, control device 30A includes an electric system control unit 31A, and a brake control unit 32A. Electric system control unit 31A sets flag FLG2 at an ON state during switching of a selected sub power storage device, and provides that flag FLG2 to brake control unit 32A. Electric system control unit 31A provides generic control of the electric system of electric powered vehicle 1A shown in FIG. 1.

When an operation of brake pedal 40 is detected by brake pedal stroke sensor 41 and flag FLG2 is ON, brake control unit 32A sets regenerative brake required level RQ to 0. Therefore, regenerative braking is not executed in such a case, and braking by hydraulic brake 42 alone is executed. When an operation on brake pedal 40 is detected by brake pedal stroke sensor 41 and flag FLG2 is OFF, brake control unit 32A calculates regenerative brake required level RQ, and outputs the calculated regenerative brake required level RQ to electric system control unit 31A.

Figure 18:
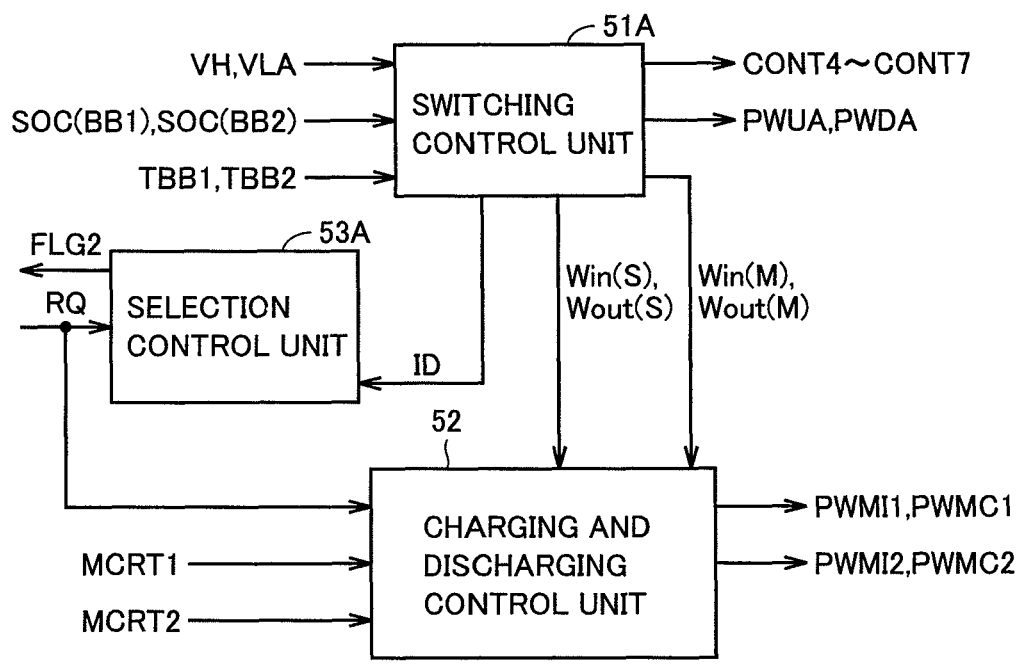
FIG. 18 is a functional block diagram for describing a configuration of an electric system control unit 31A.

FIG. 18 is functional block diagram for describing a configuration of electric system control unit 31A. Referring to FIGS. 18 and 5, electric system control unit 31A differs from electric system control unit 31 in that a switching control unit 51A and a selection control unit 53A are incorporated instead of switching control unit 51 and selection control unit 53, respectively. The configuration of the remaining elements of electric system control unit 31A is similar to the configuration of corresponding elements in electric system control unit 31.

Switching control unit 51A outputs a variable ID to selection control unit 53A. Selection control unit 53A determines whether switching control of a selected sub power storage device is currently executed or not based on variable ID. Selection control unit 53A sets flag FLG2 at an ON state when determination is made that switching control of a selected sub power storage device is currently executed. In contrast, selection control unit 53A sets flag FLG2 at an OFF state when determination is made that switching control of the selected sub power storage device is not executed based on variable ID.

The procedure of the selected sub power storage device switching process according to the second embodiment is similar to the process procedure shown in the flowchart of FIG. 7, provided that the process of step S100 (switching determination process of a selected sub power storage device) in the second embodiment differs from that of the first embodiment.

Figure 19:
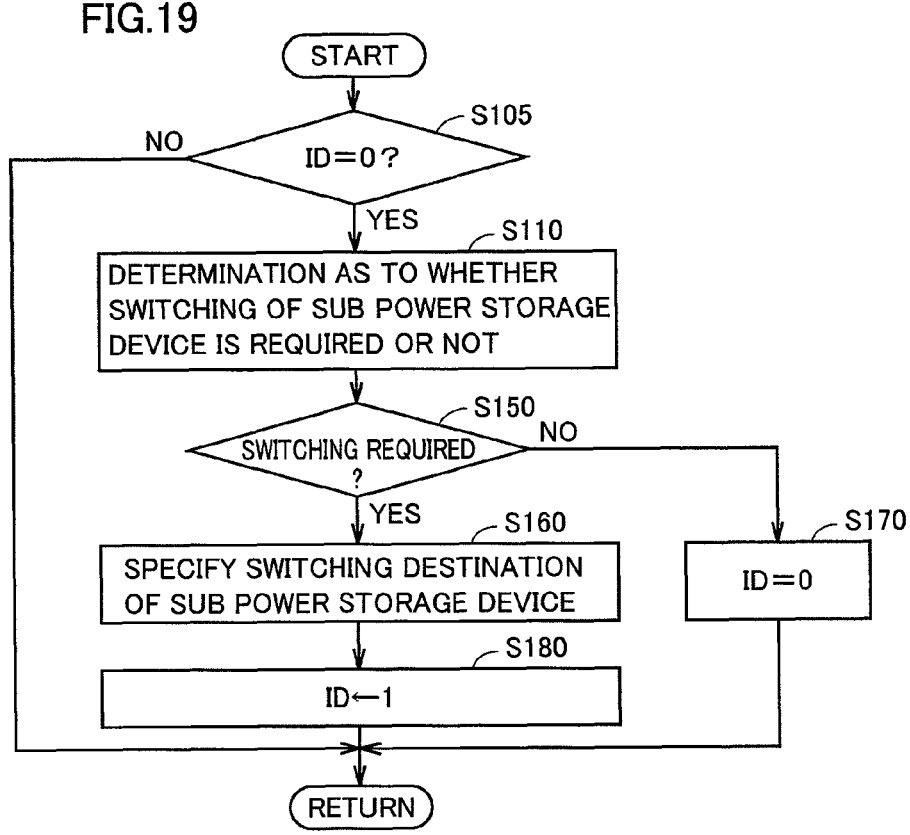
FIG. 19 is a flowchart for describing in detail a switching determination process (S100) according to a second embodiment.

FIG. 19 is a flowchart for describing in detail a switching determination process (S100) according to the second embodiment. Referring to FIGS. 19 and 8, the switching determination process of the second embodiment differs from the switching determination process of the first embodiment in that the process of step S155 is omitted. In the switching determination process according to the second embodiment, switching control unit 51A proceeds to step S150 to confirm the determination result as to whether switching is required or not made at step S110. When determination is made that switching is required (YES at step S150), switching control unit 51A proceeds to step 160 to specify a selected sub power storage device BB to be newly used. When determination is made that switching of the selected sub power storage device is not required at step S110 (NO at step S150), switching control unit 51A proceeds to step S170 to maintain ID=0.

The processes of the remaining steps in the flowchart of FIG. 18 are similar to those of the corresponding steps in the flowchart of FIG. 8. Therefore, description thereof will not be repeated. In the second embodiment, the processes of steps S200-S500 are executed likewise with the process of the flowchart shown in FIGS. 9-12.

Switching control unit 51A is similar to switching control unit 51 shown in FIG. 14 with the exception that variable ID is output, and that flag FLG1 is not input. Therefore, the remaining elements will not be repeated.

Next, a process of selection control unit 53A and brake control unit 32A will be described hereinafter.

Figure 20:
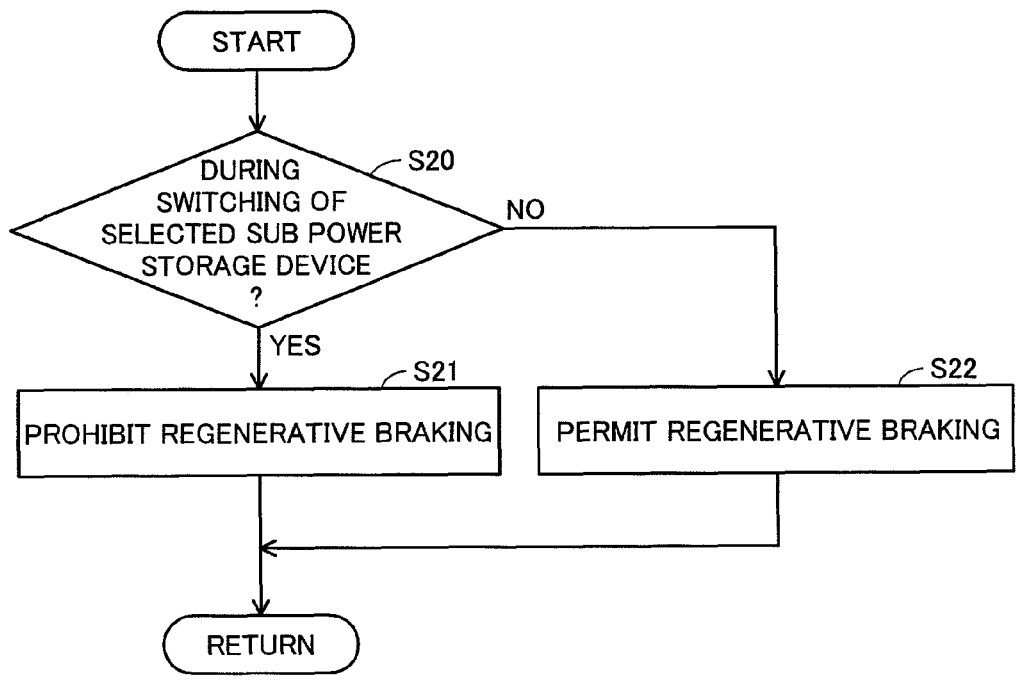
FIG. 20 is a flowchart for describing a process of a selection control unit 53A.

FIG. 20 is a flowchart for describing a process of selection control unit 53A. Control device 30 (selection control unit 53A) can repeatedly execute the control process procedure according to the flowchart shown in FIG. 20 periodically as predetermined by executing a prestored predetermined program periodically as predetermined.

Referring to FIG. 20, selection control unit 53A determines whether switching of a selected sub power storage device is currently executed or not based on variable ID output from switching control unit 51A (step S20). Specifically, selection control unit 53A determines that switching control of a selected sub power storage device is not currently executed when variable ID is −1 or 0. When variable ID is any of 1 to 4, determination is made that switching control of a selected sub power storage device is currently executed. When determination is made that a selected sub power storage device switching process is currently executed (YES at step S20), selection control unit 53A prohibits regenerative braking In other words, selection control unit 53A sets flag FLG2 at an ON state. When determination is made that switching control of a selected sub power storage device is not executed (NO at step S20), selection control unit 53A permits regenerative braking In other words, selection control unit 53A sets flag FLG2 at an OFF state.

FIG. 21 is a flowchart for describing a process of brake control unit 32A. Control device 30 (brake control unit 32A) can repeatedly execute the control process procedure according to the flowchart shown in FIG. 21 periodically as predetermined by executing a prestored predetermined program periodically as predetermined.

Referring to FIG. 21, brake control unit 32A determines whether brake pedal 40 has been operated by the user or not based on a detection result by brake pedal stroke sensor 41 (step S30). When determination is made that the user has operated brake pedal 40 (YES at step S30), brake control unit 32A determines whether regenerative braking is permitted or not based on flag FLG2 (step S31). When regenerative braking is permitted (YES at step S31), brake control unit 32A calculates regenerative brake required level RQ, and then executes regenerative braking and braking by hydraulic brake 42 (step S32). When regenerative braking is prohibited (NO at step S31), brake control unit 32A sets regenerative brake required level RQ to 0, and executes braking by hydraulic brake 42 (step S33).

When determination is made that the user is not operating brake pedal 40 (NO at step S30), the processes of steps S31-33 set forth above are skipped. When switching of a selected sub power storage device is executed in the second embodiment, regenerative braking (power generation) by motor generator MG2 is prohibited. More specifically, when switching of a selected sub power storage device is executed, input of the electric power generated by regenerative braking of motor generator MG2 to the selected sub power storage device is prohibited. As shown in FIG. 10, by temporarily relaxing the upper limits on electric power input/output of the main power storage device, and setting the upper limits on electric power input/output of the selected sub power storage device at 0, the electric power generated by regenerative braking of motor generator MG2 cannot be input to the selected sub power storage device. Therefore, control of prohibiting input of electric power to the selected sub power storage device is allowed.

As shown in FIG. 15, when charging of a selected sub power storage device is permitted in a selected sub power storage device switching mode, the executed level of regenerative braking is decreased in accordance with reduction in the upper limit on electric power input Win (S) of the selected sub power storage device. However, in the case where reduction in the regenerative brake executed level is compensated for by using a hydraulic brake, there is a possibility of the user having the impression of change in the behavior of the vehicle (for example, impression of weaker brake efficiency).

According to the second embodiment, charging of a selected sub power storage device is prohibited during switching of a selected sub power storage device(prohibit regenerative switching by motor generator MG2). This can avoid change in the user's impression on the behavior of vehicle at the time of switching a selected sub power storage device.

The embodiments are based on an electric powered vehicle mounted with a series/parallel type hybrid system having the engine power split by a power split device for transmission to the driving wheel and motor generator. The present invention is also applicable to the series type hybrid vehicle using the engine only to drive the motor generator and generating the driving force of the axle only at the motor that consumes the electric power generated by the motor generator, to an electric vehicle, as well as to a fuel cell vehicle. Since all such vehicles allow regenerative braking by a motor directed to driving the vehicle, the present invention is applicable thereto.

It should be understood that the embodiments disclosed herein are illustrative and non-restrictive in every respect. The scope of the present invention is defined by the appended claims, rather than the description set forth above, and all changes that fall within limits and bounds of the claims, or equivalence thereof are intended to be embraced by the claims.

The invention claimed is:

1. An electric powered vehicle comprising:
   a load device configured to be capable of converting kinetic energy of said electric powered vehicle into electric power;
   an electric power feeding line for transmitting electric power output from said load device;
   a main power storage device for receiving electric power from said load device via said electric power feeding line,
   a plurality of sub power storage devices provided parallel with each other;
   a connection unit configured to allow electric connection of a selected one of said plurality of sub power storage devices to said electric power feeding line; and
   a control device for controlling said load device and said connection unit,
   said control device including
   a charging control unit for executing charging control for controlling input of electric power from said load device to said main power storage device and said selected sub power storage device according to a braking request of said electric powered vehicle,
   a switching control unit for executing switching control for switching electrical connection between said plurality of sub power storage devices and said electric power feeding line, when determination is made that switching of said selected sub power storage device is required based on a state of charge of each of said plurality of sub power storage devices, and
   a selection control unit for prohibiting, when said charging control is started first, said switching control by maintaining the state in which said selected sub power storage device is electrically connected to said feed line until said charging control is completed, and for prohibiting, when said switching control is started first, said charging control by prohibiting input of the electric power from the load device to said selected sub power storage device until said switching control is completed,
   wherein said load device includes
   a motor generator for executing regenerative braking as conversion of kinetic energy of said electric powered vehicle into electric power, and for generating said kinetic energy of said electric powered vehicle by receiving electric power, and
   an inverter having power fed by said electric power feeding line to drive said motor Generator, and providing, via said electric power feeding line, electric power generated by said motor generator by said regenerative braking.

2. The electric powered vehicle according to claim 1, wherein said selection control unit prohibits said switching control unit from said switching control when said selected sub power storage device receives electric power from said load device by said charging control.

3. The electric powered vehicle according to claim 1, wherein said selection control unit prohibits said switching control unit from said switching control when output of electric power from said load device is started by said charging control.

4. The electric powered vehicle according to claim 1, wherein
   said switching control unit increases an absolute value of a first input limit value of said main power storage device and sets a second input limit value of said selected sub power storage device at 0, following starting of said switching control, and said charging control unit executes input of electric power from said load device by said main power storage device based on said first input limit value.

5. The electric powered vehicle according to claim 1, wherein said selection control unit limits said charging control by prohibiting output of electric power by said load device when said switching control is started.

6. The electric powered vehicle according to claim 1, said electric powered vehicle further comprising an internal combustion engine configured to be capable of outputting driving power of said electric powered vehicle,
wherein said load device includes
a first motor generator configured to allow power generation by being driven by said internal combustion engine,
a second motor generator allowing generation of said driving power independent of said internal combustion engine by receiving electric power, and for executing regenerative braking as conversion of kinetic energy of said electric powered vehicle into electric power, and
an inverter for transmitting and receiving electric power between at least of said first and second motor generators and said electric power feeding line.

7. The electric powered vehicle according to claim 6, wherein said selection control unit prohibits said switching control unit from said switching control, when said selected power storage device receives electric power from said second motor generator by said charging control.

8. The electric powered vehicle according to claim 6, wherein said selection control unit prohibits said switching control unit from said switching control when output of electric power from said second motor generator is started by said charging control.

9. The electric powered vehicle according to claim 6, wherein said selection control unit limits said charging control by prohibiting input of electric power from said second motor generator to said selected sub power storage device, when said switching control is started.

10. The electric powered vehicle according to claim 9, wherein
said switching control unit increases an absolute value of a first input limit value of said main power storage device, and sets a second input limit value of said selected sub power storage device at 0, following starting of said switching control, and
said charging control unit executes input of electric power from said load device by said main power storage device based on said first input limit value.

11. The electric powered vehicle according to claim 6, wherein said selection control unit limits said charging control by prohibiting output of electric power by said second motor generator when said switching control is started.

12. The electric powered vehicle according to claim 11, said electric powered vehicle further comprising a hydraulic brake provided parallel with said second motor generator, and for executing braking of said electric powered vehicle, wherein
said selection control unit outputs an instruction to render said regenerative braking by said second motor generator nonexecutable, as an instruction to prohibit said charging control unit from said charging control when said braking request of said electric powered vehicle is issued during execution of said switching control,
said control device further includes a brake control unit for controlling said regenerative braking by said second motor generator and braking by said hydraulic brake,
said brake control unit executes braking by said hydraulic brake when said braking request is issued and said regenerative braking is prohibited.

13. The electric powered vehicle according to claim 6, said electric powered vehicle further comprising:
a first voltage converter provided between said main power storage device and said electric power feeding line for performing voltage conversion bidirectionally, and
a second voltage converter provided between said plurality of sub power devices and said electric power feeding line for performing voltage conversion bidirectionally.

14. The electric powered vehicle according to claim 13, wherein said connection unit electrically connects said selected sub power storage device to said electric power feeding line by connecting said selected sub power storage device to said second voltage converter.

15. A control method for an electric powered vehicle, said electric powered vehicle including
a load device configured to be capable of converting kinetic energy of said electric powered vehicle into electric power;
an electric power feeding line for transmitting electric power output from said load device;
a main power storage device for receiving electric power from said load device via said electric power feeding line,
a plurality of sub power storage devices provided parallel with each other;
a connection unit configured to allow electric connection of a selected one of said plurality of sub power storage devices to said electric power feeding line; and
a control device for controlling said load device and said connection unit,
said control method comprising the steps of:
executing charging control for controlling input of electric power from said load device to said main power storage device and said selected sub power storage device, according to a braking request of said electric powered vehicle;
executing switching control for switching electrical connection between said plurality of sub power storage devices and said electric power feeding line when determination is made that switching of said selected sub power storage device is required based on a state of charge of each of said plurality of sub power storage devices; and
executing selection control to prohibit, when said charging control is started first, said switching control by maintaining the state in which said selected sub power storage device is electrically connected to said feed line until said charging control is completed, and to prohibit, when said switching control is started first, said charging control by prohibiting input of the electric power from the load device to the selected sub power storage device until said switching control is completed, wherein said load device includes
a motor generator for executing regenerative braking as conversion of kinetic energy of said electric powered vehicle into electric power, and for generating said kinetic energy of said electric powered vehicle by receiving electric power, and
an inverter having power fed by said electric power feeding line to drive said motor generator, and providing, via said electric power feeding line, electric power generated by said motor generator by said regenerative braking, wherein said load device includes
a motor generator for executing regenerative braking as conversion of kinetic energy of said electric powered vehicle into electric power, and for generating said kinetic energy of said electric powered vehicle by receiving electric power, and
an inverter having power fed by said electric power feeding line to drive said motor generator, and providing, via said electric power feeding line, electric power generated by said motor generator by said regenerative braking.

16. The control method for an electric powered vehicle according to claim 15, wherein said step of executing selection control prohibits said switching control when said selected sub power storage device receives electric power from said load device by said charging control.

17. The control method for an electric powered vehicle according to claim 15, wherein said step of executing selection control prohibits said switching control when output of electric power from said load device is started by said charging control.

18. The control method for an electric powered vehicle according to claim 15, wherein said step of executing switching control increases an absolute value of a first input limit value of said main power storage device and sets a second input limit value of said selected sub power storage device at 0, following starting of said switching control, and
said step of executing charging control executes input of electric power from said load device by said main power storage device based on said first input limit value.

19. The control method for an electric powered vehicle according to claim 15, wherein said step of executing selection control limits said charging control by prohibiting output of electric power by said load device when said switching control is started.

20. The control method for an electric powered vehicle according to claim 15, said electric powered vehicle further including an internal combustion engine configured to be capable of outputting driving power of said electric powered vehicle,
wherein said load device includes
a first motor generator configured to allow power generation by being driven by said internal combustion engine,
a second motor generator allowing generation of said driving power independent of said internal combustion engine by receiving electric power, and for executing regenerative braking as conversion of kinetic energy of said electric powered vehicle into electric power, and
an inverter for transmitting and receiving electric power between at least of said first and second motor generators and said electric power feeding line.

21. The control method for an electric powered vehicle according to claim 20, wherein said step of executing selection control prohibits said switching control, when said selected power storage device receives electric power from said second motor generator, by said charging control.

22. The control method for an electric powered vehicle according to claim 20, wherein said step of executing selection control prohibits said switching control when output of electric power from said second motor generator is started by said charging control.

23. The control method for an electric powered vehicle according to claim 20, wherein said step of executing selection control limits said charging control by prohibiting input of electric power from said second motor generator to said selected sub power storage device, when said switching control is started.

24. The control method for an electric powered vehicle according to claim 23, wherein
said step of executing switching control increases an absolute value of a first input limit value of said main power storage device, and sets a second input limit value of said selected sub power storage device at 0, following starting of said switching control, and
said step of executing charging control executes input of electric power from said load device by said main power storage device based on said first input limit value.

25. The control method for an electric powered vehicle according to claim 20, wherein said step of executing selection control limits said charging control by prohibiting output of electric power by said second motor generator when said switching control is started.

26. The control method for an electric powered vehicle according to claim 25, said electric powered vehicle further including a hydraulic brake provided parallel with said second motor generator, and executing braking of said electric powered vehicle,
wherein said step of executing selection control outputs an instruction to render said regenerative braking by said second motor generator nonexecutable, as an instruction to prohibit said charging control unit from said charging control when said braking request of said electric powered vehicle is issued during execution of said switching control,
said control method further comprising a step of executing braking by said hydraulic brake when said braking request is issued and said regenerative braking is prohibited.

27. The control method for an electric powered vehicle according to claim 20, said electric powered vehicle further including
a first voltage converter provided between said main power storage device and said electric power feeding line for performing voltage conversion bidirectionally, and
a second voltage converter provided between said plurality of sub power devices and said electric power feeding line for performing voltage conversion bidirectionally.

28. The control method for an electric powered vehicle according to claim 27, wherein said connection unit electrically connects said selected sub power storage device to said electric power feeding line by connecting said selected sub power storage device to said second voltage converter.

* * * * *